(12) United States Patent
Suzue et al.

(10) Patent No.: US 10,725,963 B2
(45) Date of Patent: Jul. 28, 2020

(54) DISTRIBUTED LOCK-FREE RDMA-BASED MEMORY ALLOCATION AND DE-ALLOCATION

(71) Applicant: Microsoft Technology Licensing, LLC, Redmond, WA (US)

(72) Inventors: Yutaka Suzue, Redmond, WA (US); Alexander Shamis, Seattle, WA (US); Knut Magne Risvik, Mo i Rana (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 1221 days.

(21) Appl. No.: 14/852,537

(22) Filed: Sep. 12, 2015

(65) Prior Publication Data

US 2017/0075856 A1 Mar. 16, 2017

(51) Int. Cl.
*G06F 15/167* (2006.01)
*G06F 15/173* (2006.01)
*H04L 29/08* (2006.01)

(52) U.S. Cl.
CPC .... *G06F 15/17331* (2013.01); *H04L 67/1002* (2013.01)

(58) Field of Classification Search
CPC ... G06F 9/50–5022; G06F 12/00–0692; G06F 2009/45583
USPC ............... 709/212, 213, 214, 216, 219, 245; 711/118, 147, 206
See application file for complete search history.

(56) References Cited

U.S. PATENT DOCUMENTS

| | | |
|---|---|---|
| 6,360,220 B1 | 3/2002 | Forin |
| 6,418,542 B1 | 7/2002 | Yeager |
| 6,697,878 B1 | 2/2004 | Imai |
| 7,403,945 B2 | 7/2008 | Lin et al. |
| 7,409,525 B1 * | 8/2008 | Clark ................. G06F 12/1072 711/206 |
| 7,565,454 B2 | 7/2009 | Zuberi |

(Continued)

OTHER PUBLICATIONS

"Using RDMA for Lock Management"—Chung et al, Brown University, Jul. 20, 2015 https://arxiv.org/pdf/1507.03274.pdf (Year: 2015).*

(Continued)

*Primary Examiner* — Randy A Scott
(74) *Attorney, Agent, or Firm* — Alleman Hall Creasman & Tuttle LLP

(57) ABSTRACT

An "RDMA-Based Memory Allocator" applies remote direct memory access (RDMA) messaging to provide fast lock-free memory allocations and de-allocations for shared memory distributed across multiple servers in an RDMA-based network. Alternately, in various implementations, the RDMA-Based Memory Allocator combines RDMA messaging and remote procedure call (RPC) requests to provide fast lock-free memory allocations and de-allocations for shared memory distributed across multiple servers in an RDMA-based network. In either case, any of the networked servers can act as either or both a client for requesting (or releasing) memory allocations and a host for hosting a portion of the distributed memory. Further, any server (including the requesting client) may act as the host for the distributed memory being allocated or de-allocated by any client via RDMA messaging. Advantageously, being lock-free improves overall performance of memory access between networked computers by reducing overall system latency.

20 Claims, 9 Drawing Sheets

Exemplary Architecture for Providing RDMA-Based Allocation and De-Allocation of Memory Distributed across Multiple Servers

(56) References Cited

U.S. PATENT DOCUMENTS

| | | | |
|---|---|---|---|
| 7,610,348 | B2 | 10/2009 | Kisley |
| 7,617,290 | B1 | 11/2009 | Cheriton |
| 7,617,370 | B2 | 11/2009 | Jernigan, IV et al. |
| 7,702,743 | B1 | 4/2010 | Wong |
| 7,756,943 | B1 | 7/2010 | Wong |
| 7,761,619 | B2 | 7/2010 | Feng et al. |
| 7,917,597 | B1 | 3/2011 | Lentini |
| 8,155,135 | B2 | 4/2012 | Aloni et al. |
| 8,205,015 | B2 | 6/2012 | Flynn et al. |
| 8,250,047 | B2 | 8/2012 | McKenney et al. |
| 8,255,047 | B1 | 8/2012 | Wohlgemuth et al. |
| 8,271,996 | B1 | 9/2012 | Gould et al. |
| 8,407,428 | B2 | 3/2013 | Cheriton et al. |
| 8,578,127 | B2 | 11/2013 | Thatcher et al. |
| 8,676,851 | B1 | 3/2014 | Nesbit et al. |
| 8,688,798 | B1 | 4/2014 | Lentini |
| 8,972,627 | B2 | 3/2015 | Strasser et al. |
| 9,058,122 | B1 | 6/2015 | Nesbit et al. |
| 9,792,248 | B2 | 10/2017 | Shamis et al. |
| 2002/0073257 | A1 | 6/2002 | Beukema et al. |
| 2002/0166078 | A1 | 11/2002 | Oldfield et al. |
| 2003/0145230 | A1 | 7/2003 | Chiu et al. |
| 2003/0202247 | A1 | 10/2003 | Niv et al. |
| 2004/0049580 | A1* | 3/2004 | Boyd ............... H04L 69/16 709/226 |
| 2004/0109234 | A1 | 6/2004 | Levola |
| 2004/0150717 | A1 | 8/2004 | Page et al. |
| 2004/0225719 | A1 | 11/2004 | Kisley et al. |
| 2005/0204384 | A1 | 9/2005 | Yuen et al. |
| 2009/0204755 | A1 | 8/2009 | Rushworth et al. |
| 2012/0124282 | A1 | 5/2012 | Frank et al. |
| 2012/0198284 | A1 | 8/2012 | Li |
| 2012/0233438 | A1 | 9/2012 | Bak et al. |
| 2013/0054726 | A1* | 2/2013 | Bugge ............... G06F 9/52 709/212 |
| 2013/0086183 | A1 | 4/2013 | Frank et al. |
| 2013/0159449 | A1 | 6/2013 | Taylor et al. |
| 2013/0246714 | A1 | 9/2013 | Lv et al. |
| 2013/0262384 | A1 | 10/2013 | Noguchi et al. |
| 2014/0089346 | A1 | 3/2014 | Li |
| 2014/0143368 | A1 | 5/2014 | Anderson |
| 2014/0317336 | A1 | 10/2014 | Fitch et al. |
| 2014/0325012 | A1 | 10/2014 | Guerin et al. |
| 2014/0359044 | A1 | 12/2014 | Davis et al. |
| 2014/0359145 | A1 | 12/2014 | Metzler et al. |
| 2014/0359146 | A1 | 12/2014 | Metzler et al. |
| 2015/0067086 | A1 | 3/2015 | Adriaens et al. |
| 2015/0186051 | A1 | 7/2015 | Gurajada |
| 2016/0077975 | A1* | 3/2016 | Stabrawa ............... G06F 3/0604 711/209 |
| 2016/0182433 | A1 | 6/2016 | McDaid et al. |
| 2016/0308968 | A1 | 10/2016 | Friedman |
| 2016/0357702 | A1 | 12/2016 | Shamis et al. |
| 2016/0378712 | A1 | 12/2016 | Amit et al. |
| 2017/0091246 | A1 | 3/2017 | Risvik et al. |

OTHER PUBLICATIONS

"Second Written Opinion Issued in PCT Application No. PCT/US2016/050327", dated Jul. 4, 2017, 4 Pages.

Bonwick, et al., "Magazines and Vmem: Extending the Slab Allocator to Many CPUs and Arbitrary Resources", Retrieved From << https://www.usenix.org/legacy/event/usenix01/full_papers/bonwick/bonwick.pdf>>, Jan. 4, 2002, pp. 1-20.

Bonwick, Jeff, "The Slab Allocator: An Object-Caching Kernel Memory Allocator", In the Technical Conference USENIX Summer, vol. 1, Jun. 6, 1994, 12 Pages.

Dragojević, et al., "FaRM: Fast Remote Memory", In the 11th USENIX Symposium on Networked Systems Design and Implementation (NSDI '14), Apr. 2, 2014, pp. 401-414.

"International Search Report and Written Opinion Issued in PCT Application No. PCT/US2016/050327", dated Dec. 5, 2016, 10 Pages.

"Non Final Office Action Issued in U.S. Appl. No. 14/882,357", dated Jan. 4, 2019, 16 Pages.

"International Preliminary Report on Patentability Issued in PCT Application No. PCT/US2016/056224", dated Mar. 5, 2018, 6 Pages.

Behringer, Benjamin, "Memory Management for Concurrent RDMA: A Design for a Key-Value Store", In Thesis, Jun. 3, 2014, 87 pages.

Kalia, et al., "Using RDMA Efficiently for Key-Value Services", In Proceedings of ACM Conference on SIGCOMM, Aug. 17, 2014, pp. 295-306.

Michael, Maged M., "Scalable Lock-Free Dynamic Memory Allocation", In Proceedings of ACM SIGPLAN Conference on Programming Language Design and Implementation, Jun. 9, 2004, pp. 1-12.

Noronha, et al., "Designing NFS with RDMA for Security, Performance and Scalability", In Proceedings of International Conference on Parallel Processing, Sep. 10, 2007, 8 pages.

Noureddine, Wael, "NFS/RDMA over 40Gbps iWARP", Retrieved on: Mar. 26, 2015, Available at: http://www.chelsio.com/wp-content/uploads/resources/SDC2014_Chelsio_NFSoRDMA.pdf.

Stuedi, et al., "jVerbs: Ultra-Low Latency for Data Center Applications", In Proceedings of ACM Symposium on Cloud Computing, Oct. 1, 2013, 14 pages.

Szepesi, et al., "Designing a Low-Latency Cuckoo Hash Table for Write-Intensive Workloads Using RDMA", Retrieved on: Mar. 26, 2015, Available at: https://cs.uwaterloo.ca/~bernard/nessie.pdf.

"Second Written Opinion Issued in PCT Application No. PCT/US2016/056224", dated Oct. 16, 2017, 6 Pages.

Aguilera, et al., "A Practical Scalable Distributed B-Tree", In Journal of the VLDB Endowment, vol. 1, Issue 1, Aug. 24, 2008, 12 Pages.

Bonwick, et al., "Magazines and Vmem: Extending the Slab Allocator to Many CPUs and Arbitrary Resources", Retrieved From <<http://www.parrot.org/sites/www.parrot.org/files/vmem.pdf>>, Jan. 4, 2002, 20 Pages.

Dragojevic, et al., "No compromises: distributed transactions with consistency, availability, and performance", In Proceedings of the 25th Symposium on Operating Systems Principles, Oct. 4, 2015, pp. 54-70.

"Mitchell, Christopher R, ""Building Fast, CPU-Efficient Distributed Systems on Ultra-Low Latency, RDMA-Capable Networks""", A Dissertation Submitted in Partial Fulfillment of the Requirements for the Degree of Doctor of Philosophy in Department of Computer Science, Courant Institute of Mathematical Sciences, New York University, Sep. 1, 2015, 110 Pages."

Shaw, Peling Andrew, U.S. Office Action, U.S. Appl. No. 14/728,745, dated Feb. 8, 2017, pp. 1-8.

International Search Report and Written Opinion Issued in PCT Application No. PCT/US16/061497 dated Feb. 2, 2017, 10 Pages.

International Search Report and Written Opinion Issued in PCT Application No. PCT/US2016/056224, dated Feb. 3, 2017, 11 Pages.

"Non Final Office Action Issued in U.S. Appl. No. 14/882,357", dated May 17, 2018, 17 Pages.

"Final Office Action Issued in U.S. Appl. No. 14/947,473", dated Sep. 24, 2018, 7 Pages.

"Non Final Office Action Issued in U.S. Appl. No. 14/947,473", dated Mar. 30, 2018, 8 Pages.

Bays, Carter, "A Comparison of Next-Fit, First-Fit, and Best-Fit", In Magazine—Communications of the ACM, vol. 20, Issue 3, Mar. 1977, pp. 191-192.

Choi, et al., "A Remote Memory System for High Performance Data Processing", In International Journal of Future Computer and Communication, vol. 4, Issue 1, Feb. 2015, pp. 50-54.

Corbet, "The SLUB Allocator", Retrieved from: https://lwn.net/Articles/229984/, Apr. 11, 2007, 4 Pages.

Mackall, Matt, "SLOB Allocator: Simple List of Blocks", Retrieved from: http://staff.osuosl.org/~bkero/slob.c, Mar. 30, 2012, 11 Pages.

Ongara, et al., "Fast Crash Recovery in RAMCloud", In Proceedings of the Twenty-Third ACM Symposium on Operating Systems Principles, Oct. 23, 2011, pp. 29-41.

(56) References Cited

OTHER PUBLICATIONS

Ousterhout, et al., "The Case for RAMClouds: Scalable High-Performance Storage Entirely in DRAM", In Proceedings of ACM SIGOPS Operating Systems Review, vol. 43, Issue 4, Dec. 2009, pp. 1-14.
"International Preliminary Report on Patentability Issued in PCT Application No. PCT/US2016/061497", dated May 31, 2018, 6 Pages.
"International Preliminary Report on Patentability Issued in PCT Application No. PCT/US2016/034208", dated Dec. 14, 2017, 28 Pages.
"International Preliminary Report on Patentability Issued in PCT Application No. PCT/US2016/056224", dated Feb. 16, 2018, 9 Pages.
Tanenbaum, Andrew S., "Modern Operating Systems", In Prentice Hall—Second Edition, Dec. 21, 2007, 17 Pages.
Wikipedia, "Memory Pool", Retrieved from: http://en.wikipedia.org/wiki/Memory_pool, Mar. 29, 2015, 2 Pages.
Shaw, Peling Andrew, U.S. Notice of Allowance, U.S. Appl. No. 14/728,745, dated Jul. 5, 2017, pp. 1-8.
"International Search Report and Written Opinion Issued in PCT Application No. PCT/US2016/034208", dated Aug. 5, 2016, 10 Pages.
"International Preliminary Report on Patentability Issued in PCT Application No. PCT/US2016/050327", dated Oct. 2, 2017, 6 Pages.
"Final Office Action Issued in U.S. Appl. No. 14/882,357", dated Aug. 9, 2019, 17 Pages.
"Office Action Issued in European Patent Application No. 16764045.7", dated Jul. 1, 2019, 4 Pages.

* cited by examiner

DISTRIBUTED LOCK-FREE RDMA-BASED MEMORY ALLOCATION AND DE-ALLOCATION

BACKGROUND

In general, direct memory access (DMA) provides various techniques that enable a device or process of a local host computing device to directly read and write local memory of that host device without interrupting the host's CPU(s). In contrast, remote direct memory access (RDMA), which is increasingly being deployed in data centers, extends traditional DMA-based techniques to enable a remote device or process to directly read and write memory of a remote computing device without interrupting the CPU(s) of the remote computing device.

Existing RDMA-based techniques, such as, for example, InfiniBand, iWARP, RDMA over Converged Ethernet (RoCE), etc., make use of RDMA-enabled network interface controller (NICs). When writing data across an RDMA-enabled network, servers or other computing devices equipped with an RDMA-enabled NIC typically apply DMA to read data in a user- or process-specified buffer or memory address and transmit that data as a self-contained message to an RDMA-enabled NIC of networked computing device. The receiving RDMA-enabled NIC then uses DMA to write that data into a user- or process-specified buffer or memory address. Similarly, for data reads across RDMA-enabled networks, the local computing device uses the RDMA-enabled NIC to transmit a self-contained message to an RDMA-enabled NIC of the remote computing device to request data from a user- or process-specified buffer or memory address. The remote computing device then applies DMA to read the requested data and return it to the local computing device via the RDMA-enabled NICs of each device.

SUMMARY

The following Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of other technologies may be discussed herein, the claimed subject matter is not intended to be limited to implementations that may solve or address any or all of the disadvantages of those other technologies. The sole purpose of this Summary is to present some concepts of the claimed subject matter in a simplified form as a prelude to the more detailed description that is presented below.

In general, an "RDMA-Based Memory Allocator," as described herein, applies remote direct memory access (RDMA) messaging to provide fast lock-free memory allocations and de-allocations for shared memory distributed across multiple servers in an RDMA-based network. Alternately, in various implementations, the RDMA-Based Memory Allocator combines RDMA messaging and remote procedure call (RPC) requests to provide fast lock-free memory allocations and de-allocations for shared memory distributed across multiple servers in an RDMA-based network. In either case, any of the networked servers can act as either or both a client for requesting (or releasing) memory allocations and a host for hosting a portion of the distributed memory. Further, any server (including the requesting client) may act as the host for the distributed memory being allocated or de-allocated by any client via RDMA messaging.

Memory allocations and de-allocations are accomplished via a distributed memory allocator comprising multiple instances of block allocators and slab allocators that are instantiated when needed by the block allocators. The block allocators and slab allocators generally apply RDMA read messages to determine status of particular memory blocks and memory slabs as used or free from metadata (e.g., block headers and free slab maps) associated with each memory block. In addition, the block allocators and slab allocations apply RDMA atomic compare and swap (CAS) messages to allocate or de-allocate those blocks and/or slabs based on the metadata retrieved via the RDMA read messages. In other words, block allocators perform allocations and de-allocations in combination with slab allocators via a sequence of RDMA read and CAS messages transmitted between servers via RDMA-enabled network interface controllers (NICs) to read and modify a block header and a free slab map associated with each memory block. After memory slabs have been allocated using this process, any client can read or write to any allocated slab of any host by applying RDMA reads and writes directed to a reference to the allocated slab. More specifically, a client NIC sends an RDMA message to the NIC of a host. The host then performs corresponding direct memory access (DMA) operations on its own local memory to complete the RDMA request of the client.

For example, in the case of memory allocations, the RDMA-Based Memory Allocator operates with a shared memory distributed across two or more networked computing devices. In various implementations, the RDMA-Based Memory Allocator intercepts or otherwise receives a memory allocation request by a particular one of the networked computing devices acting as a client. The RDMA-Based Memory Allocator then determines a memory slab size and a particular one of the networked computing devices acting as a host from which to allocate a slab of the shared memory in response to the memory allocation request.

In various implementations, the RDMA-Based Memory Allocator then applies an RDMA read of a plurality of memory block headers of the host. The RDMA-Based Memory Allocator then performs an RDMA read of a free slab map of the host. In general, this free slab map includes slab allocation data for a memory block selected in response to receipt of the block headers. In various implementations, the RDMA-Based Memory Allocator then allocates a selected free memory slab of the host by performing an RDMA CAS on the free slab map of the selected memory block. Finally, the RDMA-Based Memory Allocator provides a reference to the allocated memory slab to the client.

In the case of memory de-allocations, in various implementations, the RDMA-Based Memory Allocator again operates with the shared memory distributed across two or more networked computing devices. The RDMA-Based Memory Allocator intercepts or otherwise receives a de-allocation request for a particular memory slab on a particular one of the networked computing devices acting as a host. In various implementations, the RDMA-Based Memory Allocator then performs an RDMA CAS on a portion of the free slab map corresponding to a particular memory block of the host in which the memory slab is being de-allocated. This RDMA CAS updates the free slab map to mark the slab being de-allocated as free. Finally, in various implementations, the RDMA-Based Memory Allocator performs an RDMA CAS on a memory block header of the particular memory block of the host to update that block header to show one additional slab as being free.

The RDMA-Based Memory Allocator described herein provides various techniques for applying RDMA messaging to provide fast lock-free memory allocations and de-allocations for shared memory distributed across multiple servers in an RDMA-based network. This lock-free memory allocation and de-allocation reduces latency and improves throughput in the RDMA-based network. In addition to the benefits described above, other advantages of the RDMA-Based Memory Allocator will become apparent from the detailed description that follows hereinafter.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION

Figure 1:
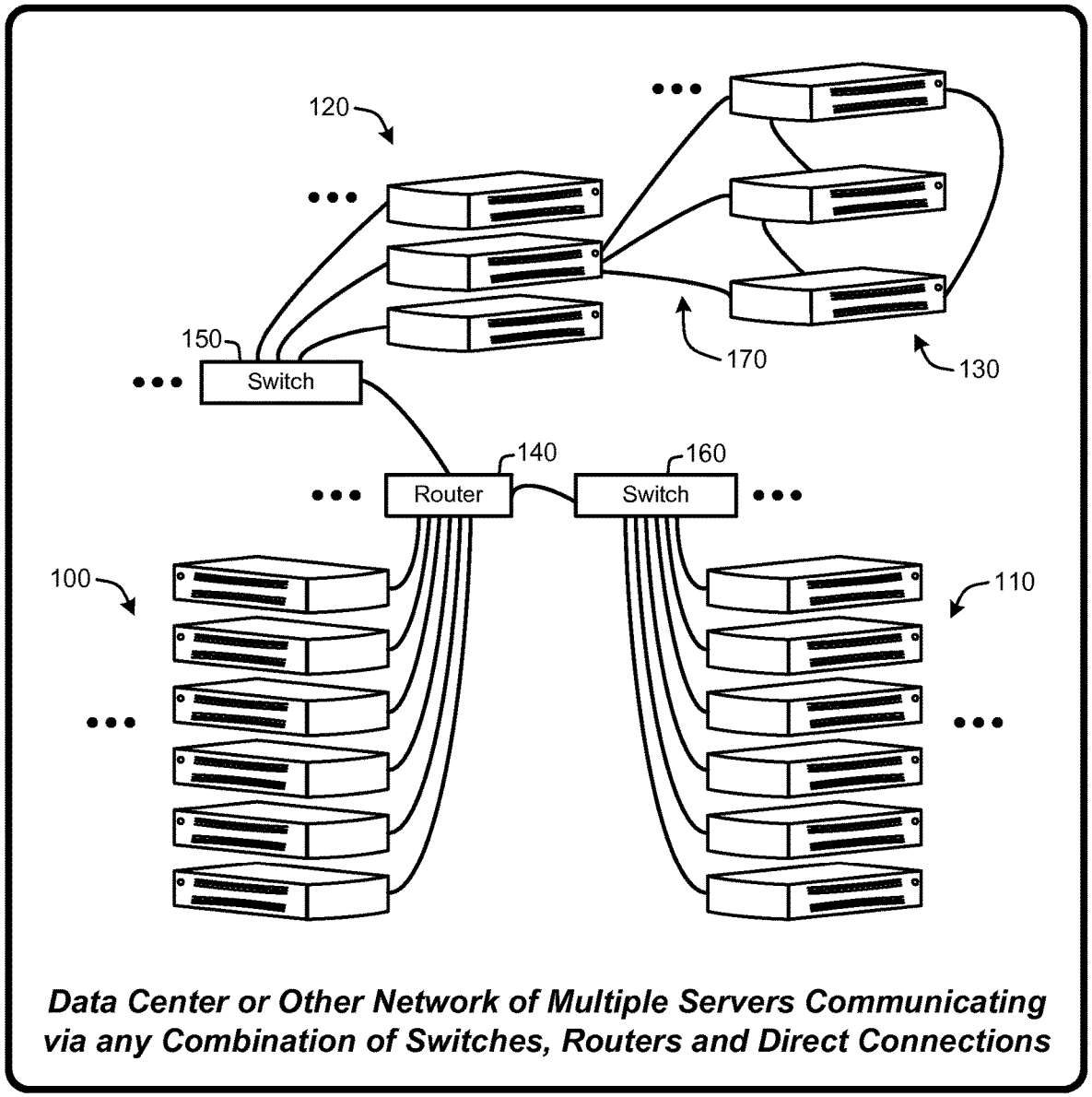
FIG. 1 illustrates an exemplary data center or other network of servers communicating via any combination of RDMA-enabled switches, routers and direct connections for use with an "RDMA-Based Memory Allocator," as described herein.

In the following description of various implementations of a "RDMA-Based Memory Allocator," reference is made to the accompanying drawings, which form a part hereof, and in which is shown by way of illustration specific implementations in which the RDMA-Based Memory Allocator may be practiced. Other implementations may be utilized and structural changes may be made without departing from the scope thereof.

Specific terminology will be resorted to in describing the various implementations described herein, and that it is not intended for these implementations to be limited to the specific terms so chosen. Furthermore, it is to be understood that each specific term includes all its technical equivalents that operate in a broadly similar manner to achieve a similar purpose. Reference herein to "one implementation," or "another implementation," or an "exemplary implementation," or an "alternate implementation" or similar phrases, means that a particular feature, a particular structure, or particular characteristics described in connection with the implementation can be included in at least one implementation of the RDMA-Based Memory Allocator. Further, the appearance of such phrases throughout the specification are not necessarily all referring to the same implementation, and separate or alternative implementations are not mutually exclusive of other implementations. The order described or illustrated herein for any process flows representing one or more implementations of the RDMA-Based Memory Allocator does not inherently indicate any requirement for the processes to be implemented in the order described or illustrated, and any such order described or illustrated herein for any process flows do not imply any limitations of the RDMA-Based Memory Allocator.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server itself can be a component. One or more components can reside within a process and a component can be localized on one computer and/or distributed between two or more computers. Further, in the context of the RDMA-Based Memory Allocator, any of a plurality of networked servers may concurrently or separately act as either or both client computing devices and host computing devices. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive in a manner similar to the term "comprising" as an open transition word without precluding any additional or other elements.

1.0 Introduction:

Remote direct memory access (RDMA) is a direct memory access from the memory of one computer into the memory of a different computer that is performed via the RDMA-enabled network interface controllers (NICs) of those computers without involving the operating system of either computer. In other words, all of the RDMA operations are performed directly by the NICs reading and writing to server memory without any interruption or notification to the CPU of either server. More specifically, the client NIC sends an RDMA message or request to the NIC of the host. The host then performs corresponding direct memory access (DMA) operations on its own local memory to complete the RDMA request of the client. However, for purposes of explanation, the following discussion will simply refer to the use of RDMA messages or requests sent by the client to the host to perform memory allocations and de-allocations. It is to be understood that the server receiving an RDMA message or request then interacts with its own memory via local DMA operations between the NIC of the host and the memory of the host.

In various implementations, the RDMA-Based Memory Allocator makes use of various RDMA verbs to enable fast lock-free memory allocations between networked computers. For example, in various implementations, these RDMA verbs include, but are not limited to RDMA write messages, RDMA read messages, and RDMA atomic compare and swap (CAS) messages.

Further, a remote procedure call (RPC) is an inter-process communication that allows a computer program, process, or thread running on one computer to cause a subroutine or procedure to execute in an address space of a different computer on a shared network. Typically, to execute an RPC, a client computer sends an RPC request to a server computer. The RPC request includes an ID of a particular procedure (e.g., a subroutine, application, process, etc.) to be executed by the server and one or more optional parameters to be used for execution of that procedure. In various implementations, a "cookie" or the like may also be sent along with the ID. In general, this cookie is an identifier (e.g., number, name, etc.) that uniquely identifies the client/sender in a way that enables the original message sent by the client to be matched to the response that is eventually received by the client.

In various implementations, the RDMA-Based Memory Allocator performs memory allocations and deallocations using RDMA-based messaging. As such, these memory allocations and de-allocations are performed without involving the CPU of the client making memory allocation or de-allocation requests, and without involving the CPU of the host on which those memory allocations and de-allocations are being made. However, in various implementations, the RDMA-Based Memory Allocator combines RDMA messaging and remote procedure call (RPC) requests to provide fast lock-free memory allocations and de-allocations for shared memory distributed across multiple servers in an RDMA-based network. In such cases, the CPUs of the client and host servers only become involved when they execute a memory allocation or de-allocation request specified by an RPC request transmitted between the client and the host servers via RPC requests sent via RDMA-based messaging.

Advantageously, being lock-free improves overall performance of memory allocations and de-allocations between networked computers by reducing overall system latency for these types of memory requests over commodity NIC hardware. Further, the ability of the messaging techniques described herein to use commodity NICs reduces networking costs relative to networks based on specialized NIC hardware. In addition, networks implemented using the RDMA-Based Memory Allocator are very flexible in that any server acting as a client (e.g., initiating malloc and de-allocation requests) with respect to one or more other hosts (e.g. hosting some portion of the distributed shared memory) may concurrently be acting as a host with respect to one or more other clients. Further, the RDMA-Based Memory Allocator is easily scalable to multiple simultaneous, concurrent, or sequential requests from servers acting in either or both a client and a host capacity, thereby improving network performance.

As illustrated by FIG. 1, the RDMA-Based Memory Allocator may be configured for use with any desired network configuration including any combination of servers (100, 110, 120 and 130) communicating via any combination of RDMA-enabled routers 140, switches (150 and 160), and direct connections 170. Advantageously, the communications and messaging techniques enabled by the RDMA-Based Memory Allocator is scalable to any number of networked computers and any number of concurrent memory allocation and de-allocation requests between any number of the networked computers. Further, once memory has been allocated by the RDMA-Based Memory Allocator, that memory may be directly read or written to by any networked computer via lock-free RDMA reads and writes transmitted between RDMA-enabled NICs.

Figure 2:
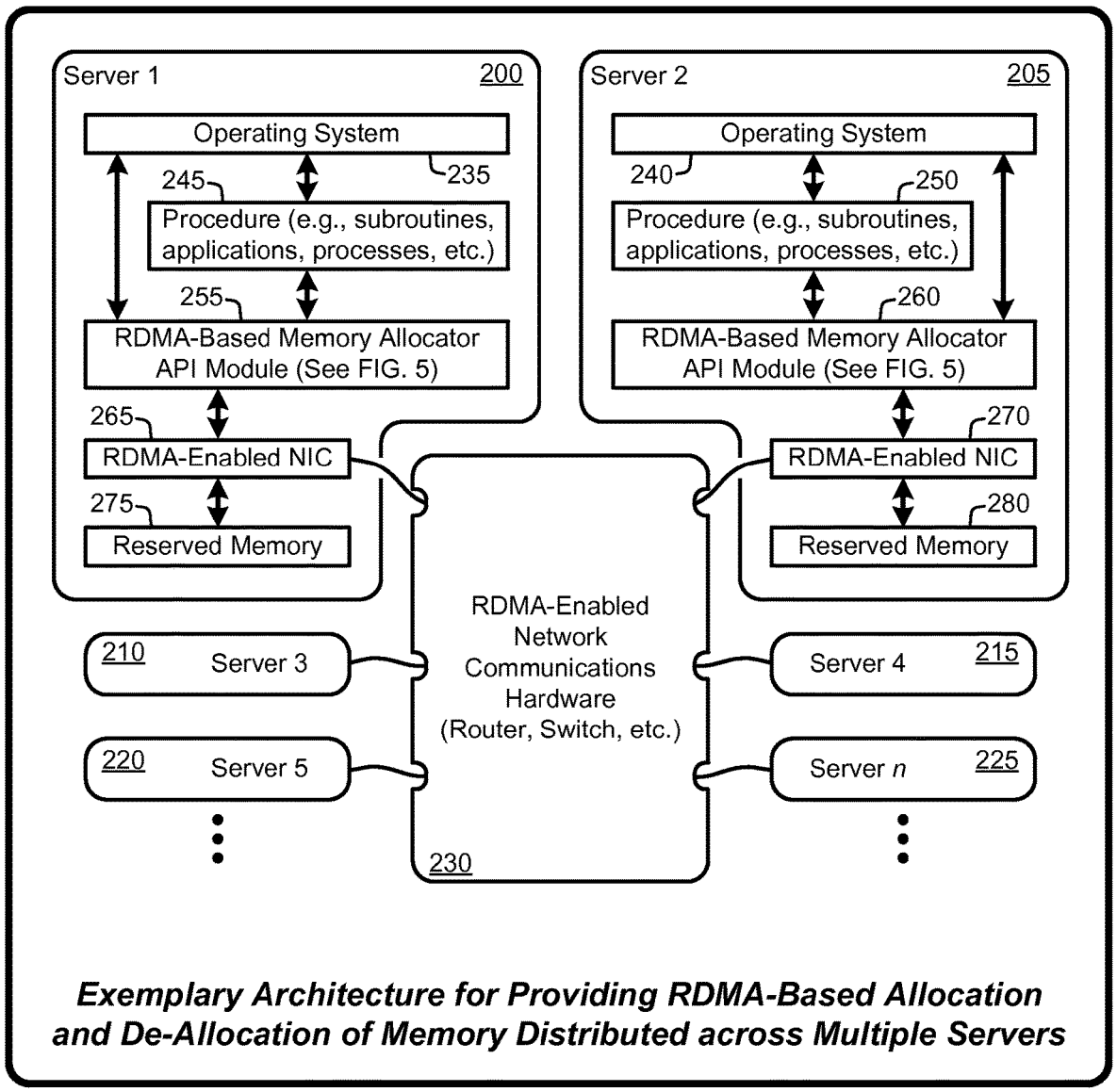
FIG. 2 illustrates a general architectural diagram for providing RDMA-based memory allocation and de-allocation using the RDMA-Based Memory Allocator.

FIG. 2 illustrates an exemplary architecture of the RDMA-Based Memory Allocator. In particular, a plurality of servers (200, 205, 210, 215, 220, and 225) are configured as a network via RDMA-enabled network communications hardware 230 such as a router, switch, or other networking hardware. Each of the servers (200, 205, 210, 215, 220, and 225) may operate as either or both a client (sending allocation and de-allocation requests) and a host (hosting a portion of the distributed shared memory) with respect to any of the other servers in the network.

Further, in various implementations, each of the servers (200, 205, 210, 215, 220, and 225) is configured to run an operating system (e.g., 235, 240), which in turn may execute one or more procedures (e.g., 245, 250). An RDMA-based memory allocator API (255, 260) resides on each server (200, 205, 210, 215, 220, and 225), and is applied to intercept and handle any memory allocation and de-allocation requests from any procedure (e.g., 245, 250) or the operating system (e.g., 235, 240) executing on each particular server. The RDMA-based memory allocator API is also referred to herein as either a memory allocator API module, or simply an API.

Finally, each of the servers (200, 205, 210, 215, 220, and 225) includes an RDMA-enabled NIC (e.g., 265, 270) that is used to send and receive RDMA messages (e.g., RDMA reads, RDMA writes, and RDMA CAS) to and from the RDMA-enabled NICs of one or more of the other servers, as described herein.

1.1 System Overview:

As mentioned above, the RDMA-Based Memory Allocator provides various techniques for applying RDMA messaging to provide fast lock-free memory allocations and de-allocations for shared memory distributed across multiple servers in an RDMA-based network. The processes summarized above are illustrated by the general system diagrams of FIG. 3 (memory allocation) and FIG. 4 (memory de-allocation).

Figure 3:
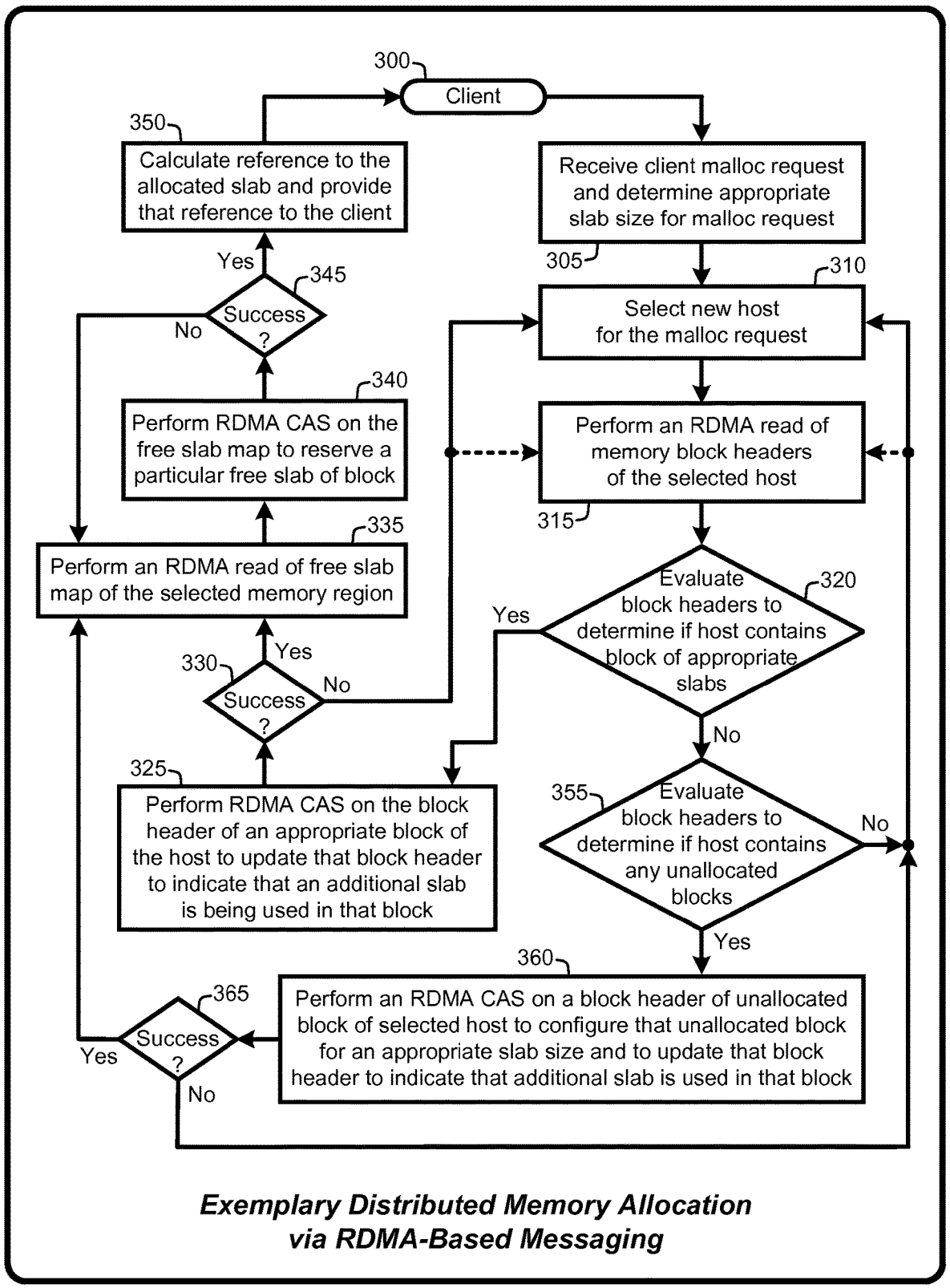
FIG. 3 illustrates a general flow diagram that illustrates various exemplary techniques for effecting RDMA-based distributed memory allocations.

In general, the system diagram of FIG. 3 illustrates various implementations of the memory allocation features of the RDMA-Based Memory Allocator, as described herein. Furthermore, while the system diagram of FIG. 3 illustrates a high-level view of various implementations of the RDMA-Based Memory Allocator, FIG. 3 is not intended to provide an exhaustive or complete illustration of every possible implementation of the RDMA-Based Memory Allocator as described throughout this document. In addition, any boxes and interconnections between boxes that may be represented by broken or dashed lines in FIG. 3 represent alternate implementations of the RDMA-Based Memory Allocator described herein. Further, any or all of these alternate implementations, as described herein, may be used in combination with other alternate implementations that are described throughout this document.

In general, as illustrated by FIG. 3, the processes enabled by the RDMA-Based Memory Allocator begin operation by receiving 305 a memory allocation (malloc) request from a client 300, and determining a memory size for an appropriate slab size for that malloc request. The size of this malloc is generally based on a request by some application, process, thread, etc., of the client for some particular amount of memory. The RDMA-Based Memory Allocator then selects 310 a particular host and/or memory region from which to service the malloc request of the client 300. In various implementations, selection of the particular host and or memory region of the host for memory allocation purposes is based on various selection methodologies, including, but not limited to, "best fit" allocation strategies to find the nest available appropriately sized block and/or slab, random selection, selection based on an analysis of traffic to and from particular hosts, selection based on association or pre-assignment of one or more hosts and/or memory regions to a particular client, etc.

In general, as discussed in further detail herein, each memory region is a contiguous section of memory that is reserved for use by the RDMA-Based Memory Allocator. Consequently, these reserved memory regions are directly addressable by RDMA-enabled NICs in response to RDMA reads, writes and CAS operations transmitted and received by the RDMA-enabled NICs of each server. Further, each individual memory region contains metadata in the form of block headers and a free slab map.

In addition, the remainder of each memory region is divided into equal sized blocks, although the block size in different memory regions may be different from that of other memory regions, depending on system configuration. Similarly, each memory block is divided into equal sized memory slabs, although the slab size in different blocks may be different from that of other blocks, depending on system configuration.

In various implementations, the metadata of the block headers comprises information including, but not limited to, an indication of whether each block in a particular memory region is free or allocated, slab sizes for each allocated block, and a count of the number of allocated slabs in each allocated block of the memory region. The free slab map comprises metadata including, but not limited to, a bitmap or other metadata, indicating whether each individual slab in each of the memory blocks of a particular memory region are free or allocated (e.g., 0 if free, or 1 is used or allocated for any particular slab).

Given this configuration of reserved memory regions with block headers and free slab maps, in various implementations, in response to the client malloc request, the RDMA-Based Memory Allocator performs 315 an RDMA read of the portion of the selected memory region that contains the block headers for that memory region. The RDMA-Based Memory Allocator then evaluates 320 these block headers to determine if that memory region of the host contains any allocated blocks of appropriately sized memory slabs (e.g., slabs of a size that are suitable for the intended malloc request).

Assuming that suitably sized memory slabs are available in one or more blocks of the selected memory region, the RDMA-Based Memory Allocator then performs 325 an RDMA CAS operation on the block header of a selected one of those blocks with suitably sized slabs (referred to as an "appropriate block"). This CAS operation serves to update the block header of the appropriate block to indicate that an additional slab is being used in that block. In other words, the count of free slabs in the appropriate block is decreased by one via successful completion 330 of this RDMA CAS operation on the block header. In the case the multiple appropriate blocks exist for a particular slab size within the selected memory region, in various implementations, selection of the particular appropriate block is based on various selection methodologies, including, but not limited to, "best fit" allocation strategies, random selection, selection based on block address order, etc.

Furthermore, upon successful completion of the RDMA CAS to update the appropriate block header to decrement the number of free slabs, the RDMA-Based Memory Allocator then performs 335 an RDMA read of the free slab map of the selected memory region. Next, given the free slab map, the RDMA-Based Memory Allocator selects one of the free slabs in the appropriate block and performs 340 an RDMA CAS operation on the free slab map to update the free slab map to show the selected slab as being allocated (e.g., change 0 to 1 in the free slab map to indicate that the selected free slab is now an allocated slab). In other words, if successful 345, this CAS operation on the free slab map reserves a selected free slab of the appropriate block by updating the corresponding entry in the free slab map. In response to a successful 345 reservation of the slab via the CAS message, the RDMA-Based Memory Allocator calculates 350 a reference to the allocated slab and provides that reference to the client 300, thus completing the malloc request.

As noted above, the client evaluates 320 block headers received via the an RDMA read 315 of the block headers of the selected host to determine if the host contains any blocks of appropriately sized memory slabs. In the case that suitably sized memory slabs are not available in one or more blocks of the host, the client further evaluates 355 those block headers to determine whether the host holds any free or unallocated blocks (e.g., memory blocks that have not yet been reserved for a particular slab size, meaning that the block has not yet been divided into slabs, and is therefore available for allocation). In this case, assuming that the host contains one or more free blocks, the client performs 360 an RDMA CAS operation on the block header of a selected one of the free blocks to reserve or allocate that block. If successful 365, this CAS operation configures the selected free block for the appropriate slab size by updating the metadata in the corresponding block header to specify the slab size for that block and to decrement the number of free slabs in that block by one. Once this previously free block has been configured for the appropriate slab size, the RDMA-Based Memory Allocator then proceeds to reserve one of the slabs in the newly configured block via the above-described sequence of performing 335 the RDMA read of the free slab map, performing 340 the RDMA CAS operation on the free slab map, and calculating 350 and providing the corresponding reference to the client 300 to complete the malloc request.

As noted above, following the evaluation 320 to determine whether the host contains blocks of appropriately sized slabs, the RDMA-Based Memory Allocator performs 325 a CAS operation on the block header of a selected appropriate block. However, in the event that this CAS operation is not successful 330 for some reason (e.g., prior reservation via a malloc request by some other client), in various implementations, the RDMA-Based Memory Allocator restarts the malloc process by selecting 310 a new host for the malloc request. However, memory is typically allocated and de-allocated at relative high frequencies in the host in response to requests by the same or other clients. Consequently, in various implementations, rather than selecting 310 a new host, the RDMA-Based Memory Allocator restarts the original malloc request on the same host by performing 315 a new RDMA read of the block headers for the originally selected memory region. In either case, as illustrated by FIG. 3, the restarted malloc process then continues as discussed above.

Similarly, if the evaluation 355 to determine whether the host contains any free or unallocated blocks indicates that no unallocated blocks are available, in various implementations, the RDMA-Based Memory Allocator restarts the malloc process by either selecting 310 a new host for the malloc request, or repeating the performance 315 of the RDMA read of the memory block headers of the selected host. As illustrated by FIG. 3, the restarted malloc process then continues as discussed above.

Similarly, as discussed above, under various circumstances, the RDMA-Based Memory Allocator performs 360 an RDMA CAS operation on the block header of a selected one of the free blocks to reserve or allocate that block. However, in the event that this CAS operation is not successful 365 for some reason (e.g., prior reservation via a malloc request by some other client), in various implementations, the RDMA-Based Memory Allocator restarts the malloc process by either selecting 310 a new host for the malloc request, or repeating the performance 315 of the RDMA read of the memory block headers of the selected host. As illustrated by FIG. 3, the restarted malloc process then continues as discussed above.

Figure 4:
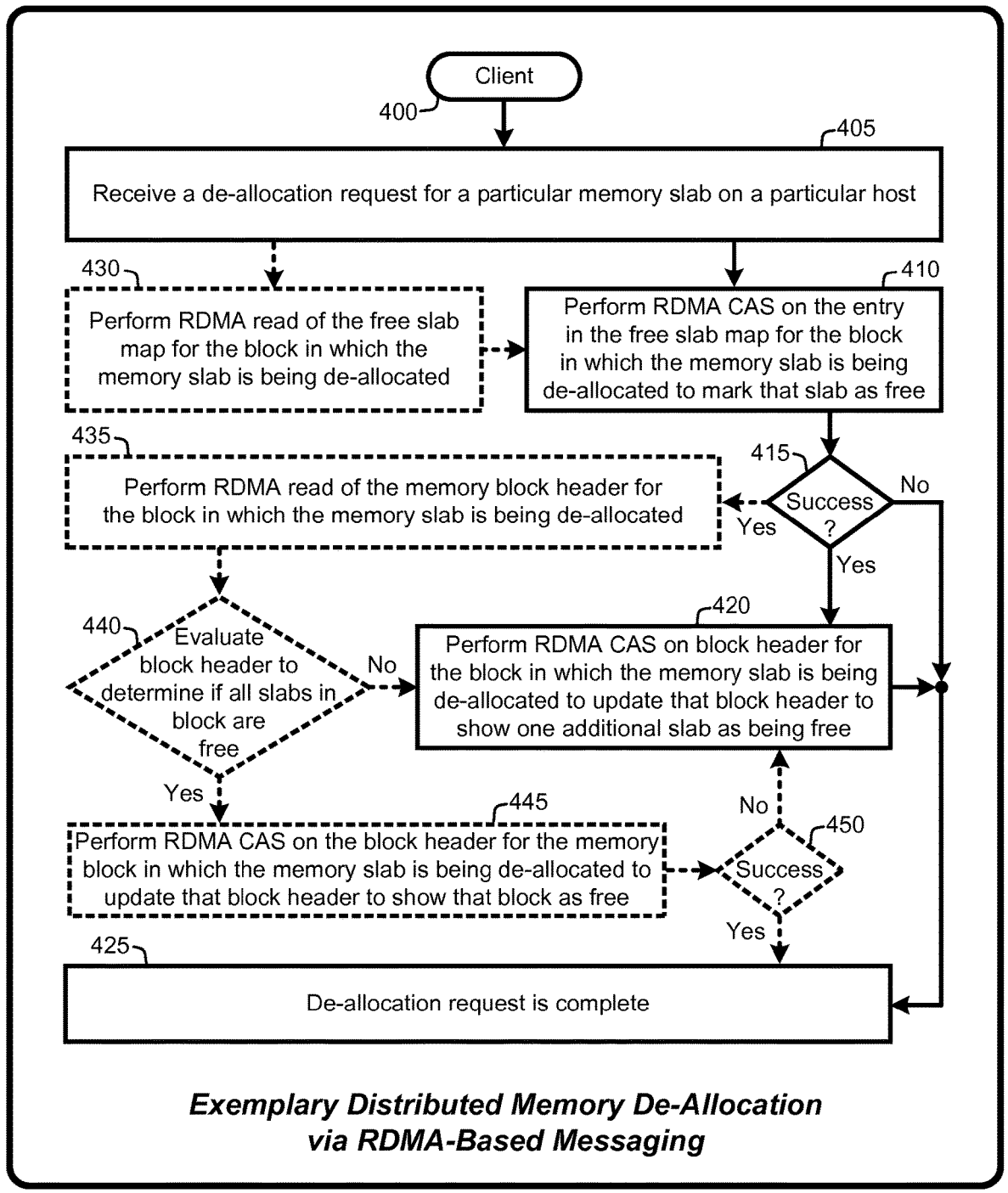
FIG. 4 illustrates a general flow diagram that illustrates various exemplary techniques for effecting RDMA-based distributed memory de-allocations.

The system diagram of FIG. 4 illustrates various implementations of the memory de-allocation features of the RDMA-Based Memory Allocator, as described herein. Furthermore, while the system diagram of FIG. 4 illustrates a high-level view of various implementations of the RDMA-Based Memory Allocator, FIG. 4 is not intended to provide an exhaustive or complete illustration of every possible implementation of the RDMA-Based Memory Allocator as described throughout this document. In addition, any boxes and interconnections between boxes that may be represented by broken or dashed lines in FIG. 4 represent alternate implementations of the RDMA-Based Memory Allocator described herein. Further, any or all of these alternate implementations, as described herein, may be used in combination with other alternate implementations that are described throughout this document. In addition, the de-allocation processes illustrated by FIG. 4 may be combined with the allocation processes illustrated by FIG. 3 to perform concurrent and ongoing memory allocations and de-allocations for memory distributed across the network.

In various implementations, the memory de-allocation process begins with the RDMA-Based Memory Allocator receiving 405 or otherwise intercepting a de-allocation request from a client 400. This de-allocation request is directed to a particular memory slab on a particular host. In response to the de-allocation request, in various implementations, the RDMA-Based Memory Allocator performs 410 an RDMA CAS operation on the entry in the free slab map relating to the particular slab that is being de-allocated to update the free slab map to mark that slab as being free (e.g., change 1 to 0 in the free slab map to indicate that the selected allocated slab is now a free slab). In the case that this RDMA CAS operation is not successful 415, then the particular slab is already marked as free (e.g., in response to a prior de-allocation request from some other client or process in the network), and the de-allocation request is complete 425. However, in the event that this CAS operation is successful 415, in various implementations, the RDMA-Based Memory Allocator performs 420 an RDMA CAS operation on the block header for the block in which the memory slab is being de-allocated to show one additional slab as being free in that block (e.g., increment the number of free slabs by 1 in the corresponding block header). At this point, the de-allocation request is complete 425.

In various implementations, prior to performing the initial CAS operation 410, the RDMA-Based Memory Allocator first performs 430 an RDMA read of the free slab map for the block in which the memory slab is being de-allocated. The information in the free slab map is then used to perform the aforementioned CAS operation 410 on the free slab map.

As noted above, in the case that the RDMA CAS operation 410 is successful 415, the RDMA-Based Memory Allocator can perform the aforementioned RDMA CAS operation 420 on the block header to complete 425 the de-allocation request. However, in various implementations, the RDMA-Based Memory Allocator performs additional operations to determine whether the corresponding block contains any allocated slabs following the de-allocation, and whether that entire block can therefore be marked as free in the corresponding block header.

In particular, following successful 415 completion of the RDMA CAS operation 410 on the free slab map, in various implementations, the RDMA-Based Memory Allocator performs 435 an RDMA read of the block header for the block in which the memory slab is being de-allocated. The RDMA-Based Memory Allocator then evaluates 440 the block header to determine whether all of the slabs in the block are free (e.g., slab count in the metadata will show zero allocated slabs following de-allocation of the particular slab). In the event that one or more of the other slabs in that block are still allocated, the RDMA-Based Memory Allocator simply performs 420 the aforementioned RDMA CAS on that block header to show one additional slab as being free to complete 425 the de-allocation request.

However, in the event that the block will have no allocated slabs following de-allocation of the particular slab, the RDMA-Based Memory Allocator instead performs 445 an RDMA CAS operation on the block header for the block in which the slab is being de-allocated to mark the entire slab as being free. Upon success 450 of this CAS operation 445, the de-allocation request is complete 425. However, in the event that this CAS operation 445 fails (e.g., some other client or process reserves or allocates an additional slab from the block before the block is freed), the RDMA-Based Memory Allocator simply performs 420 the aforementioned RDMA CAS operation on that block header to show one additional slab as being free to complete 425 the de-allocation request.

In general, as soon as a previously allocated slab or block of memory is de-allocated, that slab or block immediately becomes available for further allocations by the RDMA-Based Memory Allocator. Further, in various implementations, in the case that all slabs in a particular block have been de-allocated, the RDMA-Based Memory Allocator maintains the existing slab size for that block rather than marking the block as free. This further decreases the latency of memory allocations in the case that the existing slab size for that block is of a size that is likely to be frequently used. However, in cases of uncommon slab sizes, or limited memory resources, it may be more advantageous to mark the entire block as free following de-allocation of all slabs in that block. Generally, the decision to mark blocks as free in such cases will depend on the particular application and network traffic profiles.

2.0 Operational Details of the RDMA-Based Memory Allocator:

The above-described program modules are employed for implementing various implementations of the RDMA-Based Memory Allocator. As summarized above, the RDMA-Based Memory Allocator provides various techniques for applying RDMA messaging to provide fast lock-free memory allocations and de-allocations for shared memory distributed across multiple servers in an RDMA-based network. The following sections provide a detailed discussion of the operation of various implementations of the RDMA-Based Memory Allocator, and of exemplary methods for implementing the program modules described in Section 1 with respect to FIG. 1 through FIG. 4. In particular, the following sections provides examples and operational details of various implementations of the RDMA-Based Memory Allocator, including:

An operational overview of the RDMA-Based Memory Allocator;
RDMA verbs;
Memory Regions and division into memory blocks and memory slabs with metadata including block headers and slab maps;
Distributed memory allocations;
Distributed memory de-allocations;
RDMA-based RPC messages for memory allocation and de-allocation;
Replicating memory allocations across multiple servers; and
Allocations and de-allocations without the use of slab maps 2.1 Operational Overview:

As noted above, the RDMA-Based Memory Allocator-based processes described herein provides various techniques for applying RDMA messaging to provide fast lock-free memory allocations and de-allocations for shared memory distributed across multiple servers in an RDMA-based network. In various implementations, this messaging capability is enabled by a connection library or the like that provides an application programming interface (API) for use of RDMA-based messaging via the RDMA-enabled NICs of each server. This connection library, referred to herein as the RDMA-based memory allocator API, encapsulates various protocols to both establish and maintain connections between the NICs of any number of networked computers.

In various implementations, the library implemented by the RDMA-based memory allocator API provides a fast lock-free memory allocations and de-allocations, and subsequent access, to allocated memory based on combinations of RDMA verbs that include RDMA read messages, RDMA atomic compare and swap (CAS) messages, and RDMA write messages. Any application or process running on any server may access the API to initiate memory allocation and de-allocation requests and read or write requests of the allocated memory. The API will then automatically initiate communication between servers via RDMA-enabled NICs to process the memory request.

In various implementations, the RDMA-based memory allocator API includes "block allocators" and "slab allocators." In general, block allocators are applied to allocate and de-allocate memory blocks from contiguous regions of memory. Similarly, slab allocators are spawned or instantiated by block allocators to allocate slabs in individual blocks. Advantageously, network configurability is enhanced by enabling both the block allocators and slab allocators to reside on any server in the network while controlling memory blocks and slabs on any other server in the network. In other words, the block allocator does not need to be on the same server as the memory it manages. Further, multiple block allocators can manage the same memory even if those block allocators and the memory that is being managed are all the same or different servers. Similarly, the slab allocator does not need to be on the same server as the memory it manages, and multiple slab allocators can manage the same memory even if the slab allocators and the memory that is being managed are all on the same or different servers.

The RDMA-Based Memory Allocator applies the block allocator component of the overall RDMA-based memory allocator API to read and modify the block headers of memory regions on any host in the network via combinations of RDMA reads and RDMA CAS operations. This combination of reads and CAS operations either allocates or deallocates particular memory blocks. In various implementations, block size is consistent within each memory region, but may vary between different memory regions. However, block size in individual memory regions may vary by including additional metadata in the block headers to track and interact with variably sized blocks in any particular memory region.

Similarly, slab allocators are instantiated on demand by any of the block allocators for allocation and de-allocation of memory slabs of individual memory blocks. More specifically, each slab allocator is associated with a particular memory block and is instantiated by the block allocator when the corresponding memory block is first divided into memory slabs. The slab allocator defines the size of the slabs into which that block is being divided. In various implementations, slab size is consistent within each block, but may vary between different blocks. However, slab size in individual blocks may vary by including additional metadata in either or both the block headers and the free slab maps to track and interact with variably sized slabs. As with the block allocators, the slab allocators do not need to reside on the server from which they are allocating and de-allocating slabs from memory blocks.

In general, the RDMA-based memory allocator API is implemented based on "kernel bypass" techniques. Further, because the NIC's read and write directly to the shared distributed memory in response to RDMA-based messages, latency and system overhead are reduced for the resulting memory accesses. Kernel bypass is a concept that is applied to improve network performance by carrying out various operations and memory reads and writes without access or notification to the kernel. In a typical networking scenario, the kernel decodes network packets, e.g., TCP, and passes the data from the kernel space to "user space" by copying it. The term "user space" refers to code which runs outside the kernel (e.g., outside kernel space). User space typically refers to various programs and libraries that the OS uses to interact with the kernel, such as, for example, software that performs input/output, manipulates file system objects, application software etc. The copy process from kernel space to user space typically involves saving user space process context data and then loading kernel context data. This step of saving the user space process context data and then loading the kernel process information is typically referred to as context switch. However, application context switching has been observed to constitute a large fraction of network overhead, thereby reducing bandwidth and latency performance of computer interconnects.

The RDMA-Based Memory Allocator adapts various kernel bypass techniques to enable user space applications to communicate with the RDMA-based memory allocator API, which is adapted to communicate both with user space applications and the NIC on which the RDMA-based memory allocator API is executing. This process takes the kernel out of the path of communication between the user space process and an I/O subsystem enabled by the RDMA-based memory allocator API that handles network communication via the RDMA enabled NICs. Advantageously, this configuration eliminates context switching and copies from kernel space to user space. For example, in various implementations, the RDMA-Based Memory Allocator generally transmits RDMA reads, writes, and CAS operations via the following order of user space operations:

1. Make a determination on a local server acting as a client that an RDMA message is to be transmitted to a remote server acting as a host of some portion of the shared distributed memory. In general, this determination is made in response to a memory allocation or de-allocation request (or request to read or write to the address of an allocated memory slab) received or otherwise intercepted by the RDMA-based memory allocator API;
2. Apply a local instance of the RDMA-based memory allocator API on the client to communicate with the NIC of the local server;
3. Apply the NIC of the local server to communicate with physical networking hardware (e.g., RDMA-enabled switches, routers, etc.) of the network to send the appropriate RDMA message (e.g., reads, writes and CAS operations) across the network to the NIC of the remote server; and
4. In response to receipt of the RDMA message by the NIC of the remote server, applying the NIC of the remote server to perform the requested read, write, or CAS operation on memory of the remote server via DMA operations between that NIC and the memory on that server. In other words, each server performs local DMA operations (e.g., reads, writes, and CAS operations) in response to RDMA messages received by the NIC from other servers.

For example, in various implementations, an application, process, or thread executing on one of the networked servers acting as a "client" first instructs that client to allocate (or release) some particular amount of memory. In various implementations, the RDMA-based memory allocator API receives or otherwise intercepts that memory allocation or de-allocation request and performs a sequence of RDMA reads and RDMA CAS operations to allocate or de-allocate particular blocks and/or slabs of memory within particular memory regions of particular host servers.

Advantageously, the actual process, thread, or application using the allocated memory may not necessarily be aware of or care that the allocated memory exists on a different server in the network. That process, thread, or application simply makes use of the reference provided in response to the allocation request to read or write to the allocated memory. In other words, RDMA reads and RDMA writes are then used in combination with references to the allocated memory to read and/or write the allocated memory. As such, the RDMA-Based Memory Allocator provides these networked servers with fast lock-free access to a significantly larger shared memory space than would be possible by accessing only local server memory.

2.2 RDMA Verbs:

As noted above, in various implementations, the RDMA-Based Memory Allocator adapts a sequence of RDMA verbs to enable fast lock-free allocations, and subsequent reads and writes, of memory distributed across multiple networked computers. The RDMA verbs applied for this purpose include RDMA read messages, RDMA atomic compare and swap (CAS) messages, and RDMA write messages.

RDMA read messages enable the client to read a section of memory of the host via the RDMA NICs of the client and the host. In various implementations, the RDMA-Based Memory Allocator assumes a protected network where all servers have appropriate permissions to access one or more reserved regions of shared memory of other computers. Otherwise, an additional permission step is performed prior to performing RDMA operations to ensure that the host provides appropriate permissions to particular clients to allow the client to access its memory. Assuming such permission is in place, RDMA read operations are conducted via messaging between the NICs of the client and the host with no notification whatsoever to the operating system of the host. In other words, the RDMA read message enables the client to read memory of the host without the operating system of the host being aware of that memory read.

Similarly, RDMA write messages enable the client to write to a section of memory of the host (e.g., memory slabs allocated by the RDMA-Based Memory Allocator) via the RDMA NICs of the sender and the host. As with RDMA reads, RDMA write operations are performed with no notification to the host.

The RDMA atomic compare and swap (CAS) message is used to atomically compare a value in the RDMA CAS message from the client to a value of a specified virtual address of the host. If the compared values are equal, a value specified by the RDMA CAS message will be stored at the virtual address of the host. In other words, in an atomic transaction, a series of database operations either all occur, or nothing occurs. A guarantee of atomicity prevents updates to the memory address occurring only partially. Consequently, the RDMA transaction is not observed to be in progress by the host because at one moment in time, it has not yet happened, and at the next moment, it has already occurred in whole (or nothing happened if the transaction failed due to a mismatch of the sent value and the value held by the host). As such, the use of RDMA CAS operations, in combination with metadata obtained via RDMA reads of block headers and free slab maps, enables the RDMA-Based Memory Allocator allocate and de-allocate particular memory blocks and memory slabs by modifying the block headers and free slab maps via RDMA CAS operations on those block headers and free slab maps.

2.3 Memory Regions and Allocations into Blocks and Slabs:

As noted above, multiple servers in the network host one or more memory regions of the shared distributed memory that is reserved for and accessible by the RDMA-Based Memory Allocator. Reserving these memory regions for use by the RDMA-Based Memory Allocator ensures that servers in the network, or other processes executing on those servers, do not write to memory regions of the reserved memory except via the RDMA-Based Memory Allocator, thereby avoiding conflicts or corruption of memory managed by the RDMA-Based Memory Allocator. The reserved memory on any particular is then only accessed by the RDMA-based memory allocator API and via DMA read, write, and CAS operations on that memory by the NIC of that server in response to RDMA messages received by the NIC of the server.

In general, each memory region is defined as a contiguous section of memory that is reserved for use by the RDMA-Based Memory Allocator. In various implementations, a memory region size of 2 GB was used, with one or more of these regions being reserved on any of the networked servers. However, memory regions of any desired size may be used based on the techniques described herein. These reserved memory regions are directly addressable by RDMA-enabled NICs in response to RDMA reads, writes and CAS operations transmitted and received by the RDMA-enabled NICs of each server.

Further, each individual memory region contains a section of memory (e.g., one or more memory blocks) reserved for metadata in the form of block headers and a free slab map. In various implementations, the size of block header regions and the size of the free slab maps may be the same sizes as the blocks into which each region is divided. However, there is no requirement that block headers be the same size as free slap maps, or that either of these are the same sizes as the blocks in the same memory region. In addition, depending on memory region size and the amount of metadata in block headers and free slab maps, multiple block header sections and multiple free slab maps may be included in any particular memory region.

In various implementations, the metadata of the block headers comprises information including, but not limited to, an indication of whether each block in a particular memory region is free or allocated, slab sizes for each allocated block, and a count of the number of allocated slabs (or a count of the number of free slabs) in each allocated block of the memory region. The free slab map comprises metadata including, but not limited to, a bitmap or other metadata, indicating whether each individual slab in each of the memory blocks of a particular memory region are free or allocated (e.g., "0" if free, or "1" if used or allocated for any particular slab).

In various implementations, the remainder of each memory region (other than the metadata sections) is divided into equal sized blocks by block allocators of the RDMA-Based Memory Allocator. However, the block size in different memory regions may be different from that of other memory regions, depending on system configuration. Similarly, in various implementations, each memory block is divided into equal sized memory slabs by slab allocators of the RDMA-Based Memory Allocator. However, the slab size in different blocks may be different from that of other blocks, depending on system configuration.

In general, the block allocator component of the RDMA-based memory allocator API reserves two or more of the first blocks in its memory region for metadata. The first group of blocks, which are at least one block, contain all of the block headers for the entire memory region. These block headers contain all the shared information needed to perform lock-free operations in the allocator. The next group of blocks is the free slab map for all of the allocatable blocks in the memory region. The amount of blocks used for this metadata is based on the number of blocks, block size and the maximum number of slabs in a block. In other words, memory blocks are allocated from the memory region by block allocator components of the RDMA-based memory allocator API.

Each block allocator is responsible for allocating and de-allocating blocks from within a particular region. The block allocator is also responsible for setting a block's size and marking a block as un-used (via the block header associated with that block) when there are no more used slabs in a block. In various implementations, the block allocator applies a "best fit" allocation strategy to find space in the next appropriately sized slab and/or block. This results in a trade-off between an increase in internal fragmentation and latency of the system.

These block allocators are instantiated as needed by the RDMA-based memory allocator API and set the size of the blocks being allocated from the memory region. In various implementations, block size was set to 1 MB. However, there is no requirement that blocks be any particular size, and as such, block size can be any desired size up to the entire size of the memory region (less the portion of the memory region reserved for metadata).

Similarly, memory slabs are allocated from memory blocks by slab allocator components of the RDMA-based memory allocator API. These slab allocators are instantiated as needed by any block allocator associated with a particular memory region. In general, slabs are the smallest unit in the allocator and it is the actual individual allocation unit that any client can allocate for memory reads and writes. As noted above, the size of slabs may differ between different blocks, but is typically the same size within individual blocks. For example, in various implementations, possible slab sizes are set anywhere between one byte and one megabyte (or whatever the maximum block size has been set to, with intermediate sizes of increasing powers of 2 (e.g., 2 bytes, 4 bytes, 8 bytes, 16 bytes, 32 bytes, 64 bytes, 128 bytes, 256 bytes, etc.). Allocating the same size slabs within individual blocks makes it a simple matter to compute references to allocated slabs by simply determining an offset based on the slab count in the block. However, by including additional metadata in either the free slab map or the block header to allow determination of references to reserved slabs, the slabs can be set at any desired size within blocks.

Figure 5:
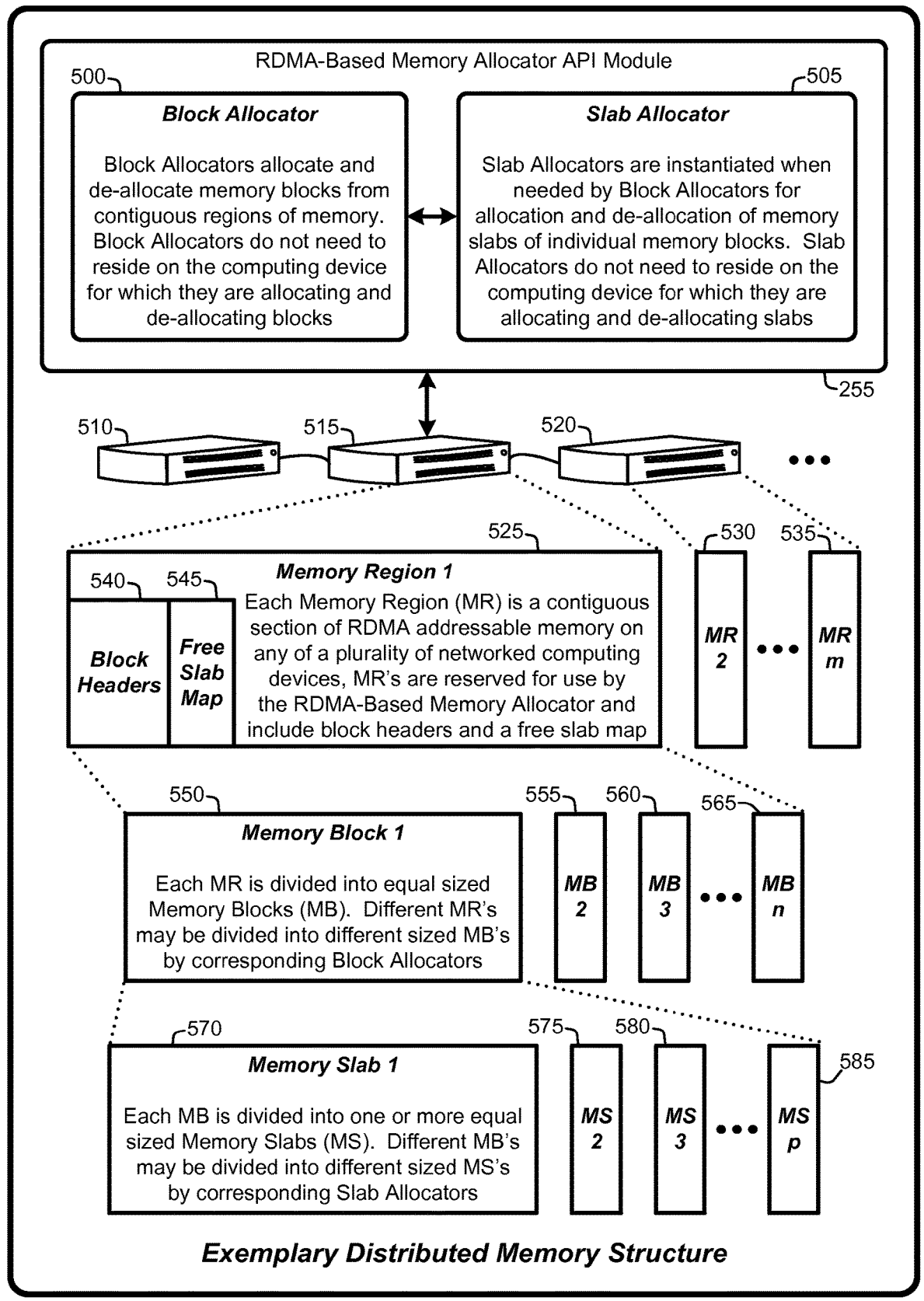
FIG. 5 illustrates an exemplary distributed memory structure controlled by the RDMA-Based Memory Allocator.

FIG. 5 illustrates an exemplary distributed memory structure of regions divided into a metadata section including block headers for use by the RDMA-Based Memory Allocator. For example, as illustrated by FIG. 5, the RDMA-based memory allocator API module 255 instantiates one or more block allocators 500 and slab allocators, on as as-needed basis. As noted above, the block allocators 500 allocate and de-allocate memory blocks from contiguous regions of memory. Further, block allocators 500 do not need to reside on the computing device for which they are allocating and de-allocating blocks. Similarly, slab allocators 505 are instantiated when needed by block allocators 500 for allocation and de-allocation of memory slabs of individual memory blocks. As with the block allocators 500, the slab allocators 505 do not need to reside on the computing device for which they are allocating and de-allocating slabs.

Further, as illustrated by FIG. 5, the RDMA-based memory allocator API 255 resides on one or more networked computing devices or servers (510, 515, and 520). One or more of these networked computing devices or servers (510, 515, and 520) hosts one or more memory regions (525, 530, 535) that is reserved for use by the RDMA-Based Memory Allocator. Each memory region (525, 530, 535) is a contiguous section of RDMA addressable memory on any of the networked computing devices. Further, each memory region (525, 530, 535) includes block headers 540 and a free slab map 545.

In addition, as illustrated by FIG. 5, in various implementations, each memory region (525, 530, 535) is divided into one or more equal sized memory blocks (550, 555, 560, 565). Different memory regions (525, 530, 535) may be divided into different sized memory blocks (550, 555, 560, 565) by corresponding block allocators 500.

Finally, as illustrated by FIG. 5, in various implementations, each memory block (550, 555, 560, 565) is divided into one or more equal sized memory slabs (570, 575, 580, 585). Different memory blocks (550, 555, 560, 565) may be divided into different sized memory slabs (570, 575, 580, 585) by corresponding slab allocators 505.

2.4 Distributed Memory Allocation Considerations:

As noted above, the RDMA-Based Memory Allocator performs both allocations and de-allocations of shared memory distributed across a network. Further, references to allocated memory are provided to clients for use in reading and writing to allocated memory slabs. The following paragraphs discuss some of the considerations of various implementations for applying the RDMA-Based Memory Allocator to performing memory allocations based solely on RDMA messaging. A discussion of memory allocation and de-allocations using combinations of RDMA and RPC is provided below in Section 2.6.

In various implementations, the RDMA-based memory allocator API operates under several constraints, none of which is mandatory, for purposes of simplifying overall system configuration and reducing both bandwidth and latency for performing memory allocations and de-allocations. For example, in various implementations, the RDMA-based memory allocator API enforces a maximum allocation size (e.g., 2 GB memory regions, 1 MB blocks, etc.) that is specified during initial setup of the RDMA-Based Memory Allocator on any particular network.

In various implementations, the RDMA-based memory allocator API uses a predetermined or static overhead for allocations. For example, consider a 2 GB memory region size for allocations. In this case, the RDMA-based memory allocator API may use a static amount of that memory region (e.g., 0.1 GB) for metadata and the remainder (e.g., 1.9 GB) for block allocations. However, in various implementations, the RDMA-based memory allocator API applies a variable overhead size for metadata based on the size of regions, block sizes, and number of and size of slabs in each block.

An additional constraint in various implementations is that once memory has been reserved, that memory is not moved. This ensures that the allocated memory is accessible via RDMA reads and writes. Further, in various implementations, the RDMA-based memory allocator API does not use any kind of blocking code (e.g., critical sections, wait for single object, etc.) because the underlying kernel code would introduce considerably more latency than RDMA reads, writes, or CAS operations. However, even though latency may increase, the use blocking code may be applied in various implementations of the RDMA-Based Memory Allocator to address particular network considerations for specific applications.

The following discussion summarizes communication between two networked computers (e.g., "Client" and "Host") during an exemplary memory allocation by the RDMA-Based Memory Allocator. The following sequence of events is not intended to describe or include all of the various implementations of the RDMA-Based Memory Allocator, and is provided only for purposes of example.

1. Client (computer A) determines the following information: where the memory region that it wants to allocate memory from is located (e.g., computer B, Host), and the desired allocation size. Consider that computer A can be the same computer as computer B, but does not have to be the same as computer B. In other words, this allocation process may be applied on a single computer acting as both Client and Host, or between different computers.
2. The Client performs an RDMA read of the block headers in the memory region on the Host.
3. The Client evaluates the block headers and determines one of the following:
   (a) The memory region of the Host contains an appropriate block from which to allocate the memory slab;
   (b) There are no appropriate allocated blocks on the Host, but there are one or more unallocated blocks on the Host; or
   (c) There are no appropriate allocated blocks on the Host and there are no unallocated blocks on the Host.
4. Based on the determination in Step 3, the Client will perform one of the following actions:
   (a) If 3(a), then the Client will perform an RDMA CAS operation on the block header of the selected block on the Host, this CAS operation will update the block header to indicate that an additional slab is being used in that block;
   (b) If 3(b), then the Client will perform an RDMA CAS on the header of an unallocated block on the Host to allocate that block, this CAS operation will initialize all of the metadata in the corresponding block header including indicating that an additional slab is being used in that block;
   (c) If 3(c), then the Client will fail the allocation. In response to this failure, several options are possible.
      i. Return an allocation error to the Client (or whatever process, thread or application on the Client made the initial malloc request);
      ii. Return to Step 1. Memory allocations and de-allocations are dynamic. Therefore, it is possible that one or more blocks or slabs have become available on the Host since the allocation failure; or
      iii. Return to Step 2. Memory allocations and de-allocations are dynamic. Therefore, it is possible that one or more blocks or slabs have become available on the Host since the allocation failure.
5. Assuming that the Client successfully performs Step 4(a) or Step 4(b), the Client will then perform an RDMA read of the free slab map of the Host.
6. In response to Step 5, the Client will evaluate the free slab map to identify an unallocated slab, and will then reserve that unallocated slab via an RDMA CAS operation on the free slab map of the Host to update the corresponding slab entry as being used.
7. In response to Step 6, the RDMA-Based Memory Allocator computes a reference to the allocated slab and provides that reference to the Client to complete the malloc operation.

2.5 Distributed Memory De-Allocation Considerations:

The following discussion summarizes communication between two networked computers during an exemplary memory de-allocation by the RDMA-Based Memory Allocator. The following sequence of events is not intended to describe or include all of the various implementations of the RDMA-Based Memory Allocator, and is provided only for purposes of example.

1. Client (computer A) determines the following information: where the memory region that it wants to de-allocate memory from is located (e.g., computer B, Host). Consider that computer A can be the same computer as computer B, but does not have to be the same as computer B. In other words, this de-allocation process may be applied on a single computer acting as both Client and Host, or between different computers.
2. The client performs an RDMA read the free slab map for the memory region in which the slab is being de-allocated.
3. The Client performs an RDMA CAS operation on the free slab map of the Host to mark the slab being de-allocated as free.
4. The Client then performs an RDMA read of the block header of the Host for the block in which the slab is being de-allocated.
5. The Client evaluates the number of reserved or allocated slabs indicated by the block header and determines one of the following case-based scenarios:
   (a) There are no other slabs in use in the block besides the slab being de-allocated; or
   (b) There are other slabs being used in the block.

6. Based on the determination of Step 5, the Client will then perform one of the operations:
   (a) If 5(a), then the Client will perform an RDMA CAS operation on the block header of the Host so as to update the block header to show the entire block as being free (i.e., unallocated);
   (b) If 5(b), then the Client will perform an RDMA CAS operation on the block header of the Host so as to update the block header to show that there is one less slab being used in the that block.
7. Following successful completion of Step 6, the de-allocation is complete and the previously allocated slab (or block) is available for further allocations.

2.6 RDMA-Based RPC Messages for Allocation and De-Allocation:

As noted above, in various implementations, the RDMA-Based Memory Allocator combines RDMA messaging and remote procedure call (RPC) requests to provide fast lock-free memory allocations and de-allocations for shared memory distributed across multiple servers in an RDMA-based network. In such cases, the CPUs of the client and host servers only become involved when they execute a memory allocation or de-allocation request specified by an RPC request transmitted between the client and the host servers via RDMA-based messaging.

For example, in various implementations, an application, process, or thread executing on any of the networked servers makes a malloc (or de-allocation) request that is intercepted by the RDMA-based memory allocator API. The RDMA-based memory allocator API of that server then applies an RDMA write to enter an RPC malloc (or de-allocation) request to a memory buffer of another one of the servers (which could be the same or a different one of the servers). One or more local threads on the receiving server then monitor that buffer for receipt of an RPC malloc or de-allocation request.

In response to receipt of that RPC-based request, the CPU of the receiving server (instead of the NIC in the case of RDMA-based requests) executes the same sequence of RDMA reads and CAS operations on the block header and free slab maps described above to perform the requested lock-free allocation or de-allocation. In response, the receiving server then sends a reference to the allocated memory to the requesting server by applying an RDMA write of that reference to a memory buffer of the requesting server. One or more local threads on the requesting server monitor the buffer of that server for receipt of the reference to the allocated memory (or confirmation of a successful de-allocation request).

The overhead and latency of sending a RPC message via RDMA is higher than the techniques described herein that rely solely on RDMA messaging. However, one of the advantages of this process is that reads, writes, and CAS operations performed by the CPU in response to receipt of an RPC message are typically much faster than reads, writes, and CAS operations performed by the NIC in response to receipt of RDMA messages.

2.7 Replicating Allocated Memory across Multiple Servers:

In various implementations, the RDMA-Based Memory Allocator optionally replicates allocated memory slabs, blocks, or entire memory regions, across one or more additional servers to provide data redundancy in the event of data corruption on a particular server or loss of a particular server for any reason. In the simplest case, entire memory regions are replicated. Further, in various implementations, memory slabs or blocks, or entire memory regions that have been replicated to one or more additional servers are automatically de-allocated whenever a call for de-allocation of the original slab, block, or entire memory region is received by the RDMA-Based Memory Allocator.

For example, when replicating a state of allocated memory, that memory is first allocated (or de-allocated) to a primary location using the RDMA-based techniques described herein. Once the memory has been allocated (or de-allocated) on the primary, the RDMA-Based Memory Allocator optionally copies each corresponding memory region to one or more replicas (on the same or different servers). As such, if there are no ongoing allocations or de-allocation each of the replicas will be identical to the primary.

In general, in various implementations, the optional replication processes performed by the RDMA-Based Memory Allocator are implemented as a simplified version of the allocation and de-allocation processes performed by the RDMA-based memory allocator API, as described above. However, any known technique for replicating memory may be applied following the original allocation by the RDMA-Based Memory Allocator.

More specifically, in the case of allocations, once a particular block and slab have been allocated to the primary, the RDMA-based memory allocator API knows exactly which block and slab have been allocated in particular memory regions. Therefore, after that allocation has been completed, the RDMA-based memory allocator API applies the RDMA-based techniques described above to create each replica by performing the steps described below (which should be understood in view of the preceding detailed description regarding RDMA-based memory allocations). However, as noted above, after any memory has been allocated by the RDMA-Based Memory Allocator, any known technique for replicating memory may be applied to create replicas. Assuming the use of the RDMA-based techniques described herein, replication is accomplished (for each replica of the primary) via the following steps:
1. Apply an RDMA CAS operation to update the number of free slabs in the appropriate block header of the replica memory region;
2. Apply an RDMA CAS operation to mark the appropriate slab as being used in the free slab map of the replica; and
3. Propagate any writes to allocated slabs on the primary to each of the replicas.

In the case of de-allocations, in various implementations, the replication process performed by the RDMA-Based Memory Allocator considers whether additional slabs are being used in a memory block of the primary following de-allocation of a particular slab.

For example, in the case where other slabs are still being used in a block following de-allocation of a particular slab, the replica is updated by using the above described RDMA-based techniques for changing the metadata to decrease number of slabs used in the block header of the replica and to mark the slab as free in the free slab map of the replica. These processes are duplicated for each replica of the primary.

Conversely, in the case where the slab being freed on the primary is the last (or only) slab being in the block, in various implementations, the RDMA-Based Memory Allocator performs the following steps:
1. Apply an RDMA CAS operation to mark the block of the primary as reserved rather than free;
2. Evaluate the first replica to ensure that the copy of the slab de-allocated on the primary is the only slab being used in the corresponding block, and when true, apply an RDMA CAS operation to mark the block of that replica as free;

3. Repeat step 2 for all replicas of the primary to complete the de-allocation process for each replica; and
4. After completing the de-allocation process on all replicas, apply an RDMA CAS operation to mark the block of the primary as free.

2.8 Allocations and De-Allocations without Free Slab Maps:

As discussed above, memory allocations and de-allocations (and optional replications) may be performed by the RDMA-Based Memory Allocator via RDMA-based messaging and/or RDMA-based RPC messages. In each of these cases, the preceding discussion referenced the use of a free slab map for allocations and de-allocations of particular memory slabs. However, in various implementations, slab management (e.g., allocations, de-allocations and replication) is provided without the use of free slab maps by including additional metadata in each block header and memory slab.

For example, as with the each of the preceding implementations, the RDMA-Based Memory Allocator makes use of block header metadata in each memory region. As discussed above, the block header metadata in the preceding implementations comprises information including, but not limited to, an indication of whether each block in a particular memory region is free or allocated, slab sizes for each allocated block, and a count of the number of allocated slabs in each allocated block of the memory region. However, in implementations where the free slab map is eliminated, the metadata of each of the block headers in a memory region further includes an additional reference to a first free slab of that block.

In addition, each slab, including the first free slab in each block, includes its own metadata header with a reference that is pointing to the next free slab in the block, and so on (e.g., a linked list) until the last free slab in the block is reached. This last free slab in the block either has no reference to any other free slab, or simply a null reference. Further, as discussed above, whenever a block is first allocated, it is divided into a set of equal sized memory slabs. Consequently, in implementations where the free slab map is not used, the metadata in each slab header is initialized during the initial block allocation process so that each slab in the block (which are initially all free) includes an initial reference to some other free slab in that block.

In various implementations, the initial references from one free slab to the next are sequential (e.g., slab-1 has a reference to slab-2, which references slab-3, and so on). However, any order of free slab references to other free slabs may be applied, including random orders, so long as all of the slabs in the block are referenced by one other slab in the block, and no slab is referenced by more than one other slab. Then, during the allocation process, the metadata in the block header indicating the next free slab will change with each allocation. Similarly, during the de-allocation process, both the metadata in the block header and the metadata in the header of the slab being freed will change with each de-allocation.

The following discussion summarizes an exemplary block allocation process by the RDMA-Based Memory Allocator for implementations in which the free slab map is eliminated. Further, this process may be modified using the techniques described in Section 2.6 that applies RDMA-based RPC messages. The following sequence of events is not intended to describe or include all of the various implementations of the RDMA-Based Memory Allocator, and is provided only for purposes of example. For example, in the case of RDMA-based block allocations for newly allocated blocks, the RDMA-Based Memory Allocator can perform allocations via the following sequence, which assumes initial sequential slab references for purposes of explanation. This block allocation process does not need to be repeated unless an entire block is de-allocated and then subsequently re-allocated.

1. Determine the memory region from which to allocate a selected free block and the desired slab size for that block;
2. Divide the block into the appropriately sized slabs;
3. Initialize the references in each slab header to point to the next sequential slab in the block. More specifically, slab-n includes an initial reference pointing to slab-(n+1) as the next free slab, and so on, with the last free slab in the block including a null reference that may change to point to some other free slab in response to subsequent slab allocations and de-allocations. For example, the slab header of the first slab (e.g., slab-1) is initialized as pointing to slab-2 as its next free slab, while the slab header of slab-2 is initialized as pointing to slab-3 as its next free slab, and so on; and
4. Initialize the block header of the block being allocated to include a reference to the first free slab (e.g., slab-1).

The following discussion summarizes an exemplary slab allocation process by the RDMA-Based Memory Allocator for implementations in which the free slab map is eliminated. Further, this process may be modified using the techniques described in Section 2.6 that applies RDMA-based RPC messages. The following sequence of events is not intended to describe or include all of the various implementations of the RDMA-Based Memory Allocator, and is provided only for purposes of example. For example, in the case of RDMA-based slab allocations, the RDMA-Based Memory Allocator can perform slab allocations via the following sequence:

1. Determine a particular memory region and slab allocation size from which to allocate a slab of memory;
2. Perform an RDMA read of the block headers in the memory region;
3. Evaluate the block headers of the memory region to obtain the reference to the first free slab (e.g., slab-a) of a particular block (e.g., a block with slabs of an appropriate size);
4. Perform an RDMA read of the metadata header of slab-a (i.e., the first free slab referenced in the block header);
5. Evaluate the metadata of slab-a to obtain the reference to the next free slab, e.g., slab-b;
6. Perform and RDMA CAS operation (based on the known reference to slab-a) on the block header to update the metadata of the block header to reference the first free slab as being slab-b. The CAS operation may fail for some reason, e.g., some other slab allocation or de-allocation occurred subsequent to step 2, above. As such, upon failure of the CAS operation, the slab allocation process can restart from either step 1 or step 2, above, and then repeat through step 6 until the CAS operation is successful; and
7. Return to a reference to slab-a to the thread, process, or application requesting the slab allocation.

The following discussion summarizes an exemplary slab de-allocation process by the RDMA-Based Memory Allocator for implementations in which the free slab map is eliminated. Further, this process may be modified using the techniques described in Section 2.6 that applies RDMA-based RPC messages. The following sequence of events is not intended to describe or include all of the various implementations of the RDMA-Based Memory Allocator, and is provided only for purposes of example. For example, in the case of RDMA-based slab de-allocations, the RDMA-Based Memory Allocator can perform slab de-allocations via the following sequence:

1. Perform an RDMA read of the block header in which a particular slab, e.g., slab j, is to be de-allocated;
2. Evaluate the metadata in the block header to obtain the reference to the first free slab in the block, e.g., slab-k;
3. Perform an RDMA write operation to update the metadata in the header of the slab being de-allocated (i.e., slab j) to reference slab-k as the next free slab in the block;
4. Perform an RDMA CAS operation (based on the known reference to slab-k) on the block header to update the metadata of that block header to reference the first free slab as being slab j. The CAS operation may fail for some reason, e.g., some other slab allocation or de-allocation occurred subsequent to step 1, above. As such, upon failure of the CAS operation, the slab de-allocation process can restart from step 1, and then repeat through step 4 until the CAS operation is successful.

Figure 6:
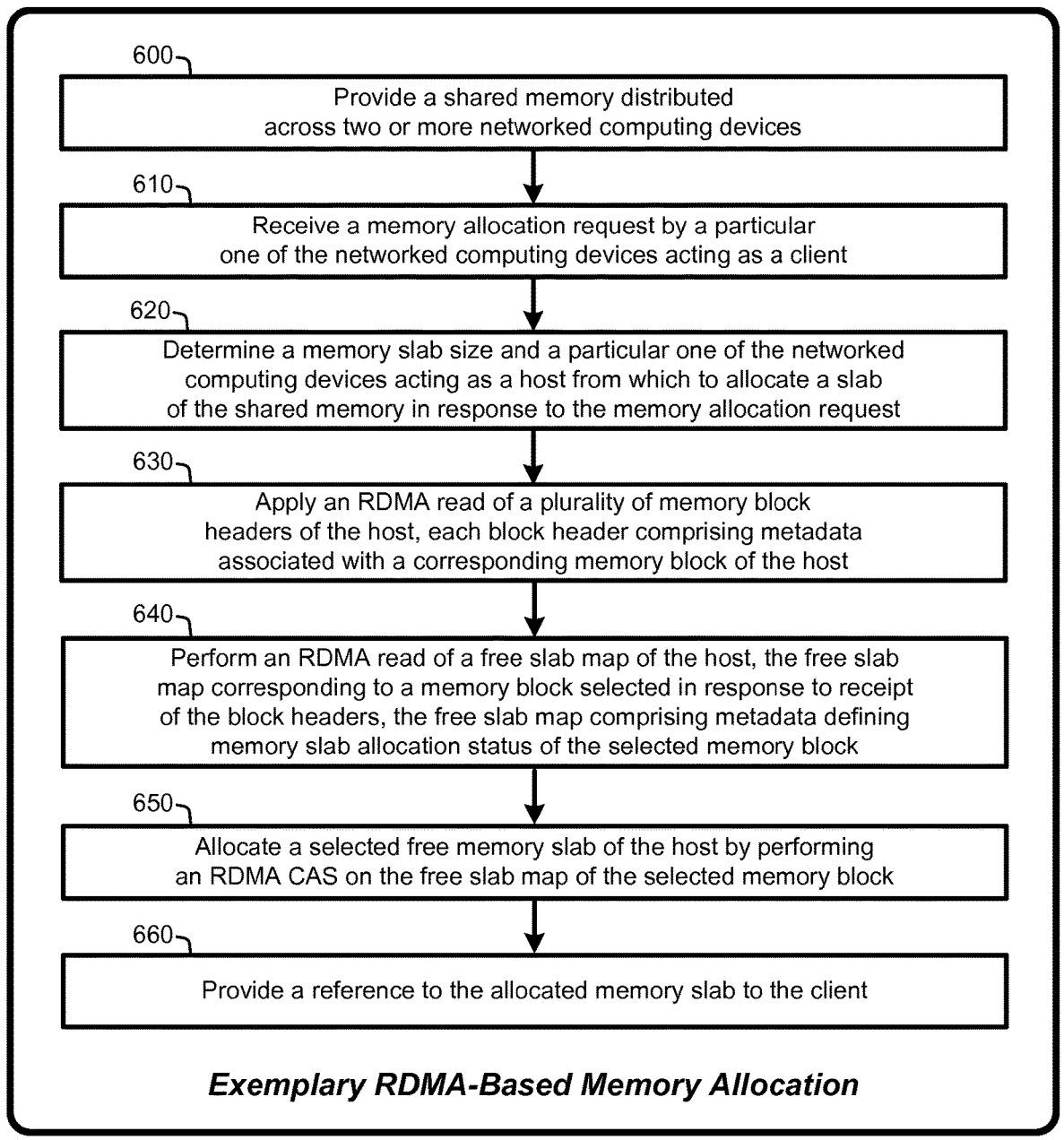
FIG. 6 illustrates an exemplary process for performing distributed memory allocations using the RDMA-Based Memory Allocator.
Figure 7:
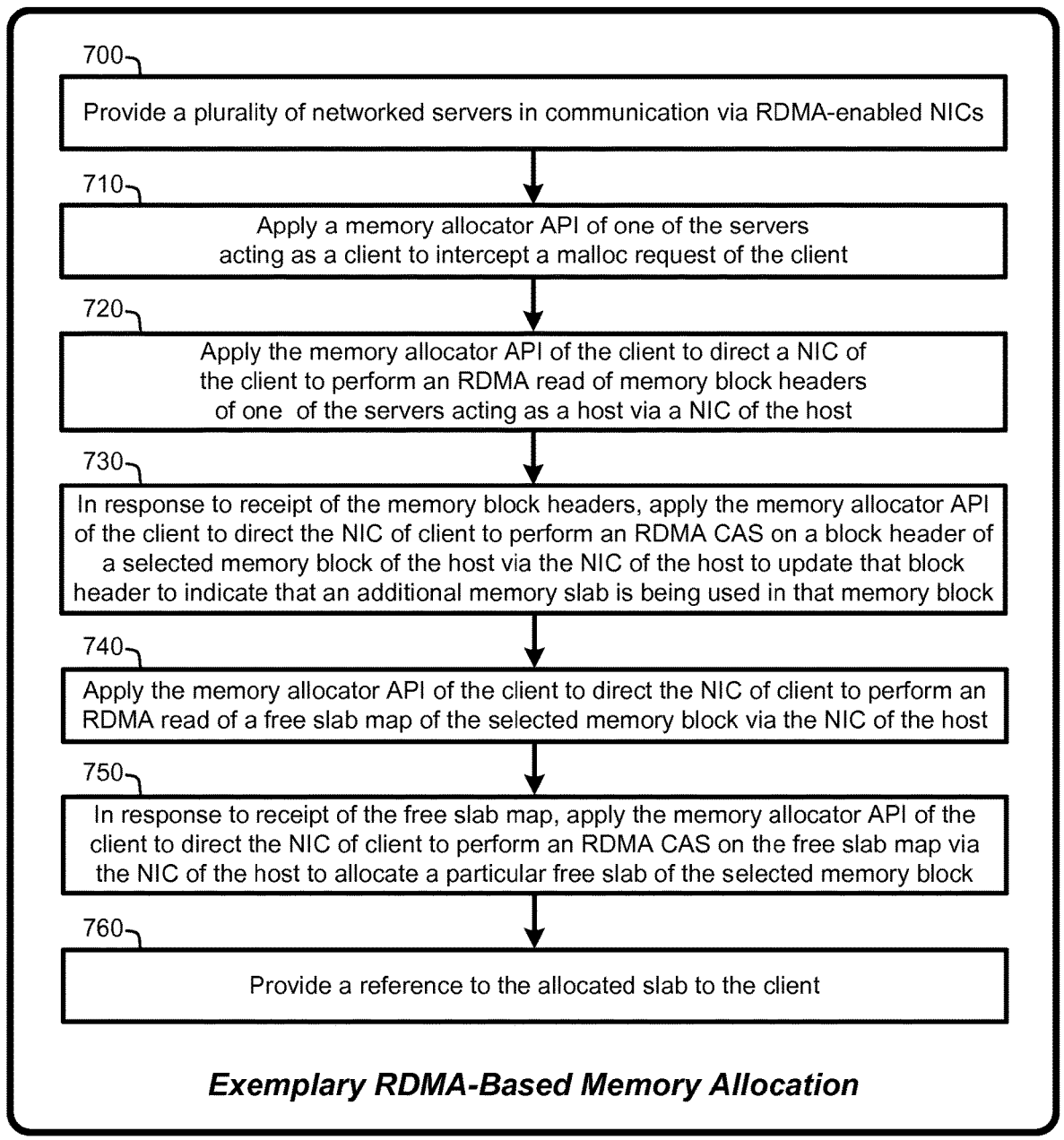
FIG. 7 illustrates an exemplary process for performing distributed memory allocations using the RDMA-Based Memory Allocator.
Figure 8:
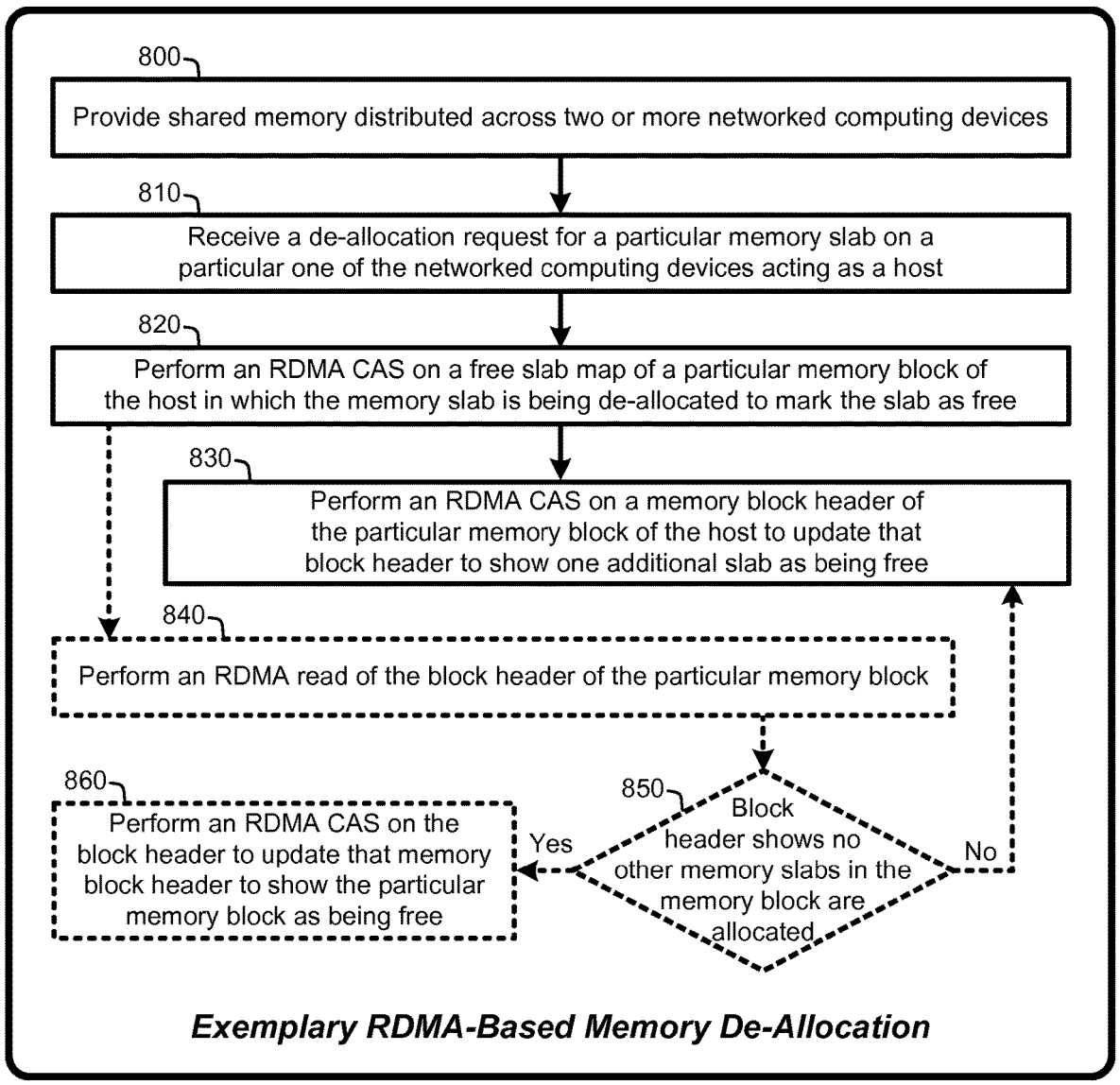
FIG. 8 illustrates an exemplary process for performing distributed memory de-allocations using the RDMA-Based Memory Allocator.

3.0 Operational Summary of the RDMA-Based Memory Allocator:

The processes described above with respect to FIG. 1 through FIG. 5, and in further view of the detailed description provided above in Sections 1 and 2, are illustrated by the general operational flow diagrams of FIG. 6 through FIG. 8. In particular, FIG. 6 through FIG. 8 provide exemplary operational flow diagrams that summarizes the operation of some of the various implementations of the RDMA-Based Memory Allocator. FIG. 6 through FIG. 8 are not intended to provide an exhaustive representation of all of the various implementations of the RDMA-Based Memory Allocator described herein, and the implementations represented in these figures are provided only for purposes of explanation.

Further, any boxes and interconnections between boxes that may be represented by broken or dashed lines in FIG. 6 through FIG. 8 represent optional or alternate implementations of the RDMA-Based Memory Allocator described herein, and that any or all of these optional or alternate implementations, as described below, may be used in combination with other alternate implementations that are described throughout this document.

In general, as illustrated by FIG. 6, in various implementations, the RDMA-Based Memory Allocator begins the process of allocating memory in a shared memory (600) distributed across two or more networked computing devices by receiving (610) a memory allocation request by a particular one of the networked computing devices acting as a client. The RDMA-Based Memory Allocator then determines (620) a memory slab size and a particular one of the networked computing devices acting as a host from which to allocate a slab of the shared memory in response to the memory allocation request.

Next, the RDMA-Based Memory Allocator applies (630) an RDMA read of a plurality of memory block headers of the host, each block header comprising metadata associated with a corresponding memory block of the host. The RDMA-Based Memory Allocator then performs (640) an RDMA read of a free slab map of the host, the free slab map corresponding to a memory block selected in response to receipt of the block headers, the free slab map comprising metadata defining memory slab allocation status of the selected memory block. In response to the RDMA read of the free slab map, the RDMA-Based Memory Allocator allocates (650) a selected free memory slab of the host by performing an RDMA CAS on the free slab map of the selected memory block. Finally, the RDMA-Based Memory Allocator provides (660) a reference to the allocated memory slab to the client to complete the allocation process.

Similarly, as illustrated by FIG. 7, in various implementations, the RDMA-Based Memory Allocator begins the process of allocating memory from a plurality of networked servers (700) in communication via RDMA-enabled NICs by applying (710) a memory allocator API of one of the servers acting as a client to intercept a malloc request of the client. The RDMA-Based Memory Allocator then applies (720) the memory allocator API of the client to direct a NIC of the client to perform an RDMA read of memory block headers of one of the servers acting as a host via a NIC of the host.

Next, in response to receipt of the memory block headers, the RDMA-Based Memory Allocator applies (730) the memory allocator API of the client to direct the NIC of client to perform an RDMA CAS on a block header of a selected memory block of the host via the NIC of the host to update that block header to indicate that an additional memory slab is being used in that memory block. The RDMA-Based Memory Allocator then applies (740) the memory allocator API of the client to direct the NIC of client to perform an RDMA read of a free slab map of the selected memory block via the NIC of the host.

In response to receipt of the free slab map, the RDMA-Based Memory Allocator applies (750) the memory allocator API of the client to direct the NIC of client to perform an RDMA CAS on the free slab map via the NIC of the host to allocate a particular free slab of the selected memory block. The RDMA-Based Memory Allocator then completes the allocation request by providing (760) a reference to the allocated slab to the client.

In contrast, FIG. 8 illustrates an example of how the RDMA-Based Memory Allocator performs memory de-allocations. For example, in various implementations, the RDMA-Based Memory Allocator begins the de-allocation process from shared memory (800) distributed across two or more networked computing devices by receiving (810) a de-allocation request for a particular memory slab on a particular one of the networked computing devices acting as a host. The RDMA-Based Memory Allocator then performs (820) an RDMA CAS on a free slab map of a particular memory block of the host in which the memory slab is being de-allocated to mark the slab as free. The RDMA-Based Memory Allocator then performs (830) an RDMA CAS on a memory block header of the particular memory block of the host to update that block header to show one additional slab as being free to complete the de-allocation request.

In further implementations, prior to performing (830) the RDMA CAS on the memory block header of the particular memory block of the host, the RDMA-Based Memory Allocator first performs (840) an RDMA read of the block header of the particular memory block. In the case that this read of the block header shows (850) that no other memory slabs in the memory block are allocated, the RDMA-Based Memory Allocator will then perform (860) an RDMA CAS on the block header to update that memory block header to show the particular memory block as being free to complete the de-allocation request. However, in the case that the read of the block header shows (850) that there are other memory slabs in the memory block that are still allocated, the RDMA-Based Memory Allocator then simply performs (830) the aforementioned RDMA CAS on the memory block header of the particular memory block of the host to update that block header to show one additional slab as being free to complete the de-allocation request.

4.0 Exemplary Implementations for RDMA-Based RPC Messaging:

The following paragraphs summarize various examples of implementations that may be claimed in the present document. The implementations summarized below are not intended to limit the subject matter that may be claimed in view of the detailed description of the RDMA-Based Memory Allocator. Further, any or all of the implementations summarized below may be claimed in any desired combination with some or all of the implementations described throughout the detailed description and any implementations illustrated in one or more of the figures, and any other implementations and examples described below. The following implementations and examples are intended to be understood in view of the detailed description and figures described throughout this document.

In various implementations, the RDMA-Based Memory Allocator applies RDMA messaging to provide fast lock-free memory allocations and de-allocations for shared memory distributed across multiple servers in an RDMA-based network. Alternately, in various implementations, the RDMA-Based Memory Allocator combines RDMA messaging and RPC requests to provide fast lock-free memory allocations and de-allocations for shared memory distributed across multiple servers in an RDMA-based network. In either case, any of the networked servers can act as either or both a client for requesting (or releasing) memory allocations and a host for hosting a portion of the distributed memory. Further, any server (including the requesting client) may act as the host for the distributed memory being allocated or de-allocated by any client via RDMA messaging. Advantageously, being lock-free improves overall performance of memory access between networked computers by reducing overall system latency.

As a first example, in various implementations, a computer-implemented process is implemented via means, processes or techniques for allocating a shared memory distributed across two or more networked computing devices. In various implementations, this process begins by receiving a memory allocation request by a particular one of the networked computing devices acting as a client. This process continues by determining a memory slab size and a particular one of the networked computing devices acting as a host from which to allocate a slab of the shared memory in response to the memory allocation request. Next, an RDMA read is applied to read a plurality of memory block headers of the host. In addition, an RDMA read of a free slab map of the host is performed. This free slab map corresponding to a memory block selected in response to receipt of the block headers. Finally, in various implementations, the allocation request is completed by allocating a selected free memory slab of the host by performing an RDMA CAS on the free slab map of the selected memory block.

As a second example, in various implementations, the first example is further modified via means, processes or techniques for providing a reference to the allocated memory slab to the client.

As a third example, in various implementations, any of the first example, and the second example are further modified via means, processes or techniques wherein each block header comprises metadata including a slab size and a number of allocated slabs in the corresponding memory block.

As a fourth example, in various implementations, any of the first example, the second example, and the third example are further modified via means, processes or techniques wherein each free slab map comprises metadata including a memory slab allocation status of the selected memory block.

As a fifth example, in various implementations, any of the first example, the second example, the third example, and the fourth example are further modified via means, processes or techniques wherein any of the networked computing devices concurrently acts as any combination of one of the hosts and one of the clients.

As a sixth example, in various implementations, any of the first example, the second example, the third example, the fourth example, and the fifth example are further modified via means, processes or techniques for applying the reference to write to the allocated memory slab via an RDMA write to that memory slab.

As a seventh example, in various implementations, any of the first example, the second example, the third example, the fourth example, the fifth example, and the sixth example are further modified via means, processes or techniques for applying the reference to read the allocated memory slab via an RDMA read of that memory slab.

As an eighth example, in various implementations, any of the first example, the second example, the third example, the fourth example, the fifth example, the sixth example, and the seventh example are further modified via means, processes or techniques for replicating the allocated slab across one or more additional networked computing devices.

As a ninth example, in various implementations, any of the first example, the second example, the third example, the fourth example, the fifth example, the sixth example, the seventh example and the eighth example are further modified via means, processes or techniques for receiving a de-allocation request for the allocated memory slab, performing an RDMA CAS on the free slab map of the selected memory block to mark the allocated slab as free, and performing an RDMA CAS on the memory block header of the selected memory block to show one additional slab as being free.

As a tenth example, in various implementations, the ninth example is further modified via means, processes or techniques for performing an RDMA read of the memory block header of the selected memory block prior to performing the RDMA CAS on that memory block header, and in the event that the memory block header shows that no other memory slabs in the selected memory block are allocated, performing an RDMA CAS on that memory block header to update that memory block header to show that memory block as being free.

As an eleventh example, in various implementations, a system is implemented via means, processes or techniques for allocating a shared memory distributed across two or more networked computing devices. In various implementations, this system begins providing a plurality of networked servers in communication via RDMA-enabled NICs. In various implementations, this system then applies a memory allocator API of one of the servers acting as a client to intercept a malloc request of the client. Next, in various implementations, this system then applies the memory allocator API of the client to direct a NIC of the client to perform an RDMA read of memory block headers of one of the servers acting as a host via a NIC of the host. In response to receipt of the memory block headers, this system then applies the memory allocator API of the client to direct the NIC of client to perform an RDMA CAS on a block header of a selected memory block of the host via the NIC of the host to update that block header to indicate that an additional memory slab is being used in that memory block. Next, in various implementations, this system applies the memory allocator API of the client to direct the NIC of client to perform an RDMA read of a free slab map of the selected memory block via the NIC of the host. Finally, in response to receipt of the free slab map, in various implementations, this system applies the memory allocator API of the client to direct the NIC of client to perform an RDMA CAS on the free slab map via the NIC of the host to allocate a particular free slab of the selected memory block.

As a twelfth example, in various implementations, the eleventh example is further modified via means, processes or techniques for providing a reference to the allocated slab to the client.

As a thirteenth example, in various implementations, the twelfth example is further modified via means, processes or techniques for applying the reference to perform any combination of reads and writes to the allocated memory slab via corresponding RDMA reads and RDMA writes to that memory slab.

As a fourteenth example, in various implementations, any of the eleventh example, the twelfth example, and the thirteenth example are further modified via means, processes or techniques wherein any of the networked servers concurrently acts as any combination of one of the hosts and one of the clients.

As a fifteenth example, in various implementations, any of the eleventh example, the twelfth example, the thirteenth example, and the fourteenth example are further modified via means, processes or techniques wherein one of the networked servers concurrently acts as both the client and the host.

As a sixteenth example, in various implementations, any of the eleventh example, the twelfth example, the thirteenth example, the fourteenth example, and the fifteenth example are further modified via means, processes or techniques for performing an RDMA CAS on the free slab map via the NIC of the host to de-allocate the allocated slab by updating the free slap to show that allocated slab as being free.

As a seventeenth example, in various implementations, a computer-implemented process is implemented via means, processes or techniques for providing a shared memory distributed across two or more networked computing devices. In various implementations, this process begins a de-allocation by receiving a de-allocation request for a particular memory slab on a particular one of the networked computing devices acting as a host. In various implementations, this process continues by performing an RDMA CAS on a free slab map of a particular memory block of the host in which the memory slab is being de-allocated to update the free slab map to mark the slab as free. Finally, in various implementations, this process completes the de-allocation request by performing an RDMA CAS on a memory block header of the particular memory block of the host to update that block header to show one additional slab as being free.

As an eighteenth example, in various implementations, the seventeenth example is further modified via means, processes or techniques for automatically de-allocating one or more replicated copies of the memory slab subject to the de-allocation request.

As a nineteenth example, in various implementations, the seventeenth example is further modified via means, processes or techniques for performing an RDMA read of the memory block header prior to performing the RDMA CAS on the memory block header, and in the event that the memory block header shows that no other memory slabs in the memory block are allocated, performing an RDMA CAS on that memory block header to update that memory block header to show that memory block as being free.

As a twentieth example, in various implementations, any of the seventeenth example and the eighteenth example are further modified via means, processes or techniques for automatically de-allocating one or more replicated copies of the memory block shown as being free.

Figure 9:
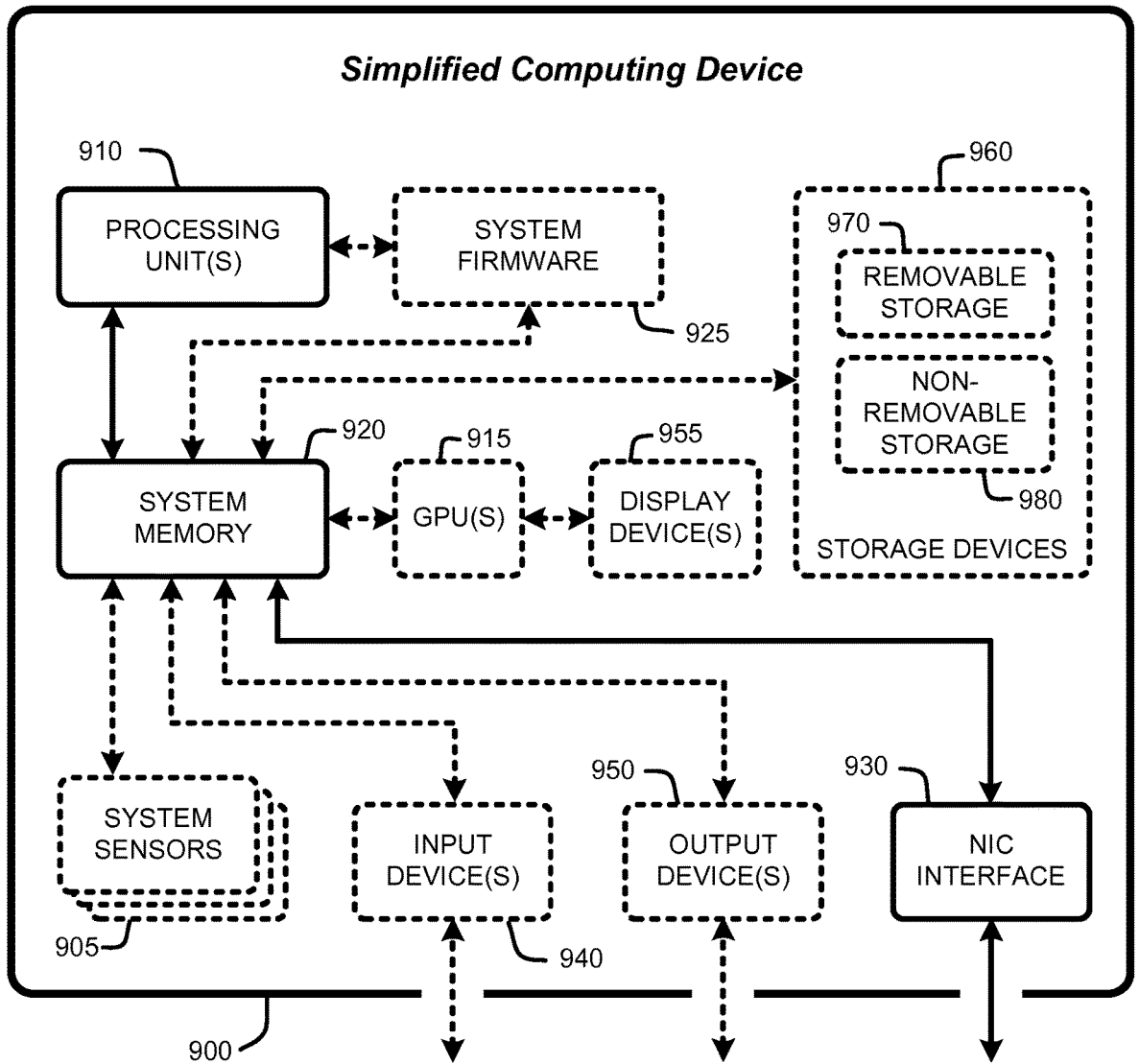
FIG. 9 is a general system diagram depicting a simplified general-purpose computing device having simplified computing and I/O capabilities for use in effecting various implementations of the RDMA-Based Memory Allocator, as described herein.

5.0 Exemplary Operating Environments:

The RDMA-Based Memory Allocator implementations described herein are operational within numerous types of general purpose or special purpose computing system environments or configurations. FIG. 9 illustrates a simplified example of a general-purpose computer system on which various implementations and elements of the RDMA-Based Memory Allocator, as described herein, may be implemented. Any boxes that are represented by broken or dashed lines in the simplified computing device 900 shown in FIG. 9 represent alternate implementations of the simplified computing device. As described below, any or all of these alternate implementations may be used in combination with other alternate implementations that are described throughout this document.

The simplified computing device 900 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the RDMA-Based Memory Allocator implementations described herein, the device should have a sufficient computational capability and system memory to enable basic computational operations. In particular, the computational capability of the simplified computing device 900 shown in FIG. 9 is generally illustrated by one or more processing unit(s) 910, and may also include one or more graphics processing units (GPUs) 915, either or both in communication with system memory 920. The processing unit(s) 910 of the simplified computing device 900 may be specialized microprocessors (such as a digital signal processor (DSP), a very long instruction word (VLIW) processor, a field-programmable gate array (FPGA), or other micro-controller) or can be conventional central processing units (CPUs) having one or more processing cores and that may also include one or more GPU-based cores or other specific-purpose cores in a multi-core processor.

In addition, the simplified computing device 900 may also include other components, such as, for example, a network interface controller 930. The simplified computing device 900 may also include one or more conventional computer input devices 940 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 900 and with any other component or feature of the RDMA-Based Memory Allocator, including input, output, control, feedback, and response to one or more users or other devices or systems associated with the RDMA-Based Memory Allocator, are enabled by a variety of Natural User Interface (NUI) scenarios. The NUI techniques and scenarios enabled by the RDMA-Based Memory Allocator include, but are not limited to, interface technologies that allow one or more users user to interact with the RDMA-Based Memory Allocator in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other input devices 940 or system sensors 905. Such NUI implementations are also enabled by the use of various techniques including, but not limited to, information derived from system sensors 905 or other input devices 940 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the RDMA-Based Memory Allocator.

However, the aforementioned exemplary NUI scenarios may be further augmented by combining the use of artificial constraints or additional signals with any combination of NUI inputs. Such artificial constraints or additional signals may be imposed or generated by input devices 940 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the RDMA-Based Memory Allocator.

The simplified computing device 900 may also include other optional components such as one or more conventional computer output devices 950 (e.g., display device(s) 955, audio output devices, video output devices, devices for transmitting wired or wireless data transmissions, and the like). Typical network interface controllers (NICs) 930, input devices 940, output devices 950, and storage devices 960 for general-purpose computers are well known to those skilled in the art, and will not be described in detail herein.

The simplified computing device 900 shown in FIG. 9 may also include a variety of computer-readable media. Computer-readable media can be any available media that can be accessed by the computing device 900 via storage devices 960, and include both volatile and nonvolatile media that is either removable 970 and/or non-removable 980, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), Blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. The terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various RDMA-Based Memory Allocator implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware 925, hardware, or any combination thereof to control a computer to implement the disclosed subject matter. The term "article of manufacture" as used herein is intended to encompass a computer program accessible from any computer-readable device, or media.

The RDMA-Based Memory Allocator implementations described herein may be further described in the general context of computer-executable instructions, such as program modules, being executed by a computing device. Generally, program modules include routines, programs, objects, components, data structures, and the like, that perform particular tasks or implement particular abstract data types. The RDMA-Based Memory Allocator implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

6.0 Other Implementations:

The foregoing description of the RDMA-Based Memory Allocator has been presented for the purposes of illustration and description. It is not intended to be exhaustive or to limit the claimed subject matter to the precise form disclosed. Many modifications and variations are possible in light of the above teaching. Further, any or all of the aforementioned alternate implementations may be used in any combination desired to form additional hybrid implementations of the RDMA-Based Memory Allocator. It is intended that the scope of the RDMA-Based Memory Allocator be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the RDMA-Based Memory Allocator described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known to enable such interactions.

What is claimed is:

1. A computer-implemented process where shared memory is distributed across two or more networked computing devices, the process comprising:
   receiving a memory allocation request by a networked computing device acting as a client;
   determining a memory slab size and a networked computing device acting as a host from which to allocate a slab of the shared memory in response to the memory allocation request;
   applying a remote direct-memory access (RDMA) read of a plurality of memory block headers of the host, including a memory block header of a selected memory block;
   in response to receipt of the plurality of memory block headers, performing an RDMA compare-and-swap (CAS) on the memory block header of the selected memory block to update the memory block header of the selected memory block, to indicate that an additional memory slab is being used in the selected memory block;
   performing an RDMA read of a free slab map of the host, the free slab map corresponding to a memory block selected in response to receipt of the memory block headers; and
   allocating a selected free memory slab of the host by performing an RDMA CAS on the free slab map of the selected memory block.

2. The computer-implemented process of claim 1 further comprising providing a reference to the allocated memory slab to the client.

3. The computer-implemented process of claim 1 wherein each block header comprises metadata including a slab size and a number of allocated slabs in the corresponding memory block.

4. The computer-implemented process of claim 1 wherein each free slab map comprises metadata including a memory slab allocation status of the selected memory block.

5. The computer-implemented process of claim 1 wherein any of the networked computing devices concurrently acts as any combination of one of the hosts and one of the clients.

6. The computer-implemented process of claim 1 further comprising applying the reference to write to the allocated memory slab via an RDMA write to that memory slab.

7. The computer-implemented process of claim 1 further comprising applying the reference to read the allocated memory slab via an RDMA read of that memory slab.

8. The computer-implemented process of claim 1 further comprising:
- receiving a de-allocation request for the allocated memory slab;
- performing an RDMA CAS on the free slab map of the selected memory block to mark the allocated slab as free; and
- performing an RDMA CAS on the memory block header of the selected memory block to show one additional slab as being free.

9. The computer-implemented process of claim 8 further comprising:
- in the event that the memory block header shows that no other memory slabs in the selected memory block are allocated, performing an RDMA CAS on that memory block header to update that memory block header to show that memory block as being free.

10. The computer-implemented process of claim 1 further comprising replicating the allocated slab across one or more additional networked computing devices.

11. A system, comprising:
a plurality of networked servers in communication via a plurality of remote direct-memory access (RDMA)-enabled network-interface controllers (NICs), the plurality of networked servers being configured to:
- apply a memory allocator application-programming interface (API) of one of the servers acting as a client to intercept a malloc request of the client;
- apply the memory allocator API of the client to direct a NIC of the client to perform an RDMA read of memory block headers of one of the servers acting as a host via a NIC of the host;
- in response to receipt of the memory block headers, apply the memory allocator API of the client to direct the NIC of the client to perform an RDMA CAS on a block header of a selected memory block of the host via the NIC of the host to update that block header to indicate that an additional memory slab is being used in that memory block;
- apply the memory allocator API of the client to direct the NIC of client to perform an RDMA read of a free slab map of the selected memory block via the NIC of the host; and
- in response to receipt of the free slab map, apply the memory allocator API of the client to direct the NIC of the client to perform an RDMA compare-and-swap (CAS) on the free slab map via the NIC of the host to allocate a particular free slab of the selected memory block.

12. The system of claim 11 wherein the plurality of networked servers are further configured to provide a reference to the allocated slab to the client.

13. The system of claim 12 wherein the plurality of networked servers are further configured to apply the reference to perform any combination of reads and writes to the allocated memory slab via corresponding RDMA reads and RDMA writes to that memory slab.

14. The system of claim 11 wherein at least one of the plurality of networked servers concurrently acts as both the client and the host.

15. The system of claim 11 wherein the plurality of networked servers are further configured to perform an RDMA CAS on the free slab map via the NIC of the host to de-allocate the allocated slab by updating the free slap to show that allocated slab as being free.

16. A computer-implemented process where shared memory is distributed across two or more networked computing devices, the process comprising:
- receiving a de-allocation request for a particular memory slab on a particular networked computing device acting as a host;
- performing a remote direct-memory access (RDMA) compare-and-swap (CAS) on a free slab map of a particular memory block of the host in which the memory slab is being de-allocated to update the free slab map to mark the slab as free; and
- performing an RDMA read and subsequent RDMA CAS on a memory block header of the particular memory block of the host to update that block header to show the particular memory block as being free.

17. The computer-implemented process of claim 16 further comprising automatically de-allocating one or more replicated copies of the memory slab subject to the de-allocation request.

18. The computer-implemented process of claim 17 wherein the subsequent RDMA CAS is enacted provided that the memory block header shows that no other memory slabs in the particular memory block are allocated.

19. The computer-implemented process of claim 16 further comprising automatically de-allocating one or more replicated copies of the memory block shown as being free.

20. The computer-implemented process of claim 18 wherein the RDMA CAS is a first RDMA CAS, the method further comprising performing a second RDMA CAS on the memory block header of the particular memory block of the host to update that memory block header to show one additional slab as being free, wherein the second RDMA CAS is performed if the memory block header shows that one or more other memory slabs in the particular memory block are still allocated.

* * * * *